(12) United States Patent
Kitamoto et al.

(10) Patent No.: US 11,784,334 B2
(45) Date of Patent: Oct. 10, 2023

(54) CONTROL DEVICE, ELECTRIC POWER SUPPLY DEVICE, WORK MACHINE, CONTROL METHOD, AND COMPUTER READABLE RECORDING MEDIUM

(71) Applicant: HONDA MOTOR CO., LTD., Tokyo (JP)

(72) Inventors: Ryota Kitamoto, Saitama (JP); Yuki Kuwano, Saitama (JP); Kotaro Shigeno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 17/342,548

(22) Filed: Jun. 9, 2021

(65) Prior Publication Data

US 2021/0296669 A1   Sep. 23, 2021

Related U.S. Application Data

(63) Continuation of application No. PCT/JP2018/045971, filed on Dec. 13, 2018.

(51) Int. Cl.
| | |
|---|---|
| *H01M 8/04858* | (2016.01) |
| *H01M 8/043* | (2016.01) |
| *B60L 53/14* | (2019.01) |
| *B60L 58/40* | (2019.01) |
| *B60L 50/75* | (2019.01) |

(Continued)

(52) U.S. Cl.
CPC ......... *H01M 8/04925* (2013.01); *B60L 50/75* (2019.02); *B60L 53/14* (2019.02);
(Continued)

(58) Field of Classification Search
None
See application file for complete search history.

(56) References Cited

U.S. PATENT DOCUMENTS

| | | | |
|---|---|---|---|
| 5,154,986 A | 10/1992 | Takechi | |
| 6,847,127 B1 * | 1/2005 | Lee | B60L 58/34 290/40 C |

(Continued)

FOREIGN PATENT DOCUMENTS

| | | |
|---|---|---|
| JP | 2001143736 A | 5/2001 |
| JP | 2004040994 A | 2/2004 |

(Continued)

OTHER PUBLICATIONS

International Preliminary Report on Patentability for International Application No. PCT/JP2018/045971, issued by the International Bureau of WIPO dated Jun. 8, 2021.

(Continued)

*Primary Examiner* — Jared Fureman
*Assistant Examiner* — Joel Barnett

(57) ABSTRACT

An electric power supply device supplies electric power to a work machine having an electric power source. The electric power supply device includes a fuel cell different from the electric power source and an electric power connecting section for transferring electric power between the electric power source and the electric power supply device. A control device for controlling the electric power supply device includes a rated capability obtaining section for obtaining the information indicating the rated value of the charge and discharge capability of the electric power source of the work machine in response to the electric power supply device being mounted in the work machine or the electric power supply device being able to utilize the electric power of the electric power source, and an operating condition determining section for determining the operating condition of the electric power supply device based on the rated value.

20 Claims, 13 Drawing Sheets

(51) Int. Cl.
    *H01M 8/04082*     (2016.01)
    *H01M 8/04537*     (2016.01)
    *H01M 8/04664*     (2016.01)

(52) U.S. Cl.
    CPC ............ *B60L 58/40* (2019.02); *H01M 8/043* (2016.02); *H01M 8/04201* (2013.01); *H01M 8/04574* (2013.01); *H01M 8/04604* (2013.01); *H01M 8/04664* (2013.01); *H01M 2250/20* (2013.01)

(56) References Cited

U.S. PATENT DOCUMENTS

| | | | |
|---|---|---|---|
| 2008/0314660 A1 | 12/2008 | Davies | |
| 2009/0105895 A1* | 4/2009 | Shige | B60W 10/28 |
| | | | 701/22 |
| 2009/0148735 A1 | 6/2009 | Manabe | |
| 2009/0258270 A1 | 10/2009 | Kizaki | |
| 2010/0068576 A1 | 3/2010 | Hamada | |
| 2012/0308851 A1* | 12/2012 | Akiyama | H01M 16/006 |
| | | | 429/9 |
| 2016/0006059 A1 | 1/2016 | Kwon | |

FOREIGN PATENT DOCUMENTS

| | | | |
|---|---|---|---|
| JP | 2005295705 A | 10/2005 |
| JP | 2006140065 A | 6/2006 |
| JP | 2007141787 A | 6/2007 |
| JP | 2007157600 A | 6/2007 |
| JP | 2007184243 A | 7/2007 |
| JP | 2008004482 A | 1/2008 |
| JP | 2008529230 A | 7/2008 |
| JP | 2009059610 A | 3/2009 |
| JP | 2009261199 A | 11/2009 |
| JP | 2010193714 A | 9/2010 |
| JP | 2016015302 A | 1/2016 |
| JP | 2016024924 A | 2/2016 |
| WO | 2008146928 A1 | 12/2008 |
| WO | 2012081153 A1 | 6/2012 |

OTHER PUBLICATIONS

Office Action issued for counterpart Chinese Application 201880099924.8, issued by The State Intellectual Property Office of People's Republic of China dated May 31, 2023.

* cited by examiner

| 800 | 822 | 832 | 834 | 836 | 842 | 844 REMAINING LIFE [hr or kWh] | |
|---|---|---|---|---|---|---|---|
| | TIME | ELAPSED TIME AFTER SHIPPING [hr] | ACCUMULATED OPERATING TIME [hr] | ACCUMULATED ELECTRIC POWER GENERATION AMOUNT [kWh] | DEGRADATION DEGREE [—] | RECORD VALUE | PLANNED VALUE |
| | 2018/10/23 : | * | * | * | * | * | * |
| | 2018/10/23 : | * | * | * | * | * | * |
| | 2018/10/23 : | * | * | * | * | * | * |
| | 2018/10/24 : | * | * | * | * | * | * |
| | 2018/10/24 : | * | * | * | * | * | * |
| | ·· | ·· | ·· | ·· | ·· | ·· | ·· |

| TIME | OUTPUT | | WORKING SITUATION | | | |
|---|---|---|---|---|---|---|
| | VOLTAGE | CURRENT | RATE | TEMP-ERATURE | HUMI-DITY | OPERATION MODE | OPERATION STATE |
| 2018/10/23 : | * | * | * | * | *** | PRIORITIZING OUTPUT | REGULAR OPERATION |
| 2018/10/23 : | * | * | * | * | *** | PRIORITIZING OUTPUT | IDLE OPERATION |
| 2018/10/23 : | * | * | * | * | *** | MENTENANCE | — |
| 2018/10/24 : | * | * | * | * | *** | PRIORITIZING FUEL CONSUMPTION | REGULAR OPERATION |
| 2018/10/24 : | * | * | * | * | *** | SUPPRESSING DEGRADATION | REGULAR OPERATION |
| .. | .. | .. | .. | .. | .. | .. | .. |

1100, 1122, 1124, 1126

CONTROL DEVICE, ELECTRIC POWER SUPPLY DEVICE, WORK MACHINE, CONTROL METHOD, AND COMPUTER READABLE RECORDING MEDIUM

The contents of the following international application are incorporated herein by reference:
NO. PCT/JP2018/045971 filed in WO on Dec. 13, 2018.

BACKGROUND

1. Technical Field

The present invention is related to a control device, an electric power supply device, a work machine, a control method, and a computer readable recording medium.

2. Related Art

An electric power generation device such as a fuel cell is mounted as a power source of a work machine such as a vehicle in some cases (for example, see Patent document 1 to 3).

PRIOR ART DOCUMENT

Patent Document

Patent Document 1: Japanese Unexamined Patent Application, Publication No. 2004-040994
Patent Document 2: Japanese Unexamined Patent Application, Publication No. 2009-261199
Patent Document 3: WO2012/081153

BRIEF DESCRIPTION OF THE DRAWINGS

FIG. 8 schematically shows one example of a data table 800.
FIG. 11 schematically shows one example of a data table 1100.

DESCRIPTION OF EXEMPLARY EMBODIMENTS

Hereinafter, the invention will be described through embodiments of the invention, but the following embodiments do not limit the invention according to claims. In addition, not all combinations of features described in the embodiments necessarily are essential to solving means of the invention. Identical or similar portions in figures are given identical reference numbers, and the same explanation is omitted in some cases.

The Summary of the Vehicle 100

Figure 1:
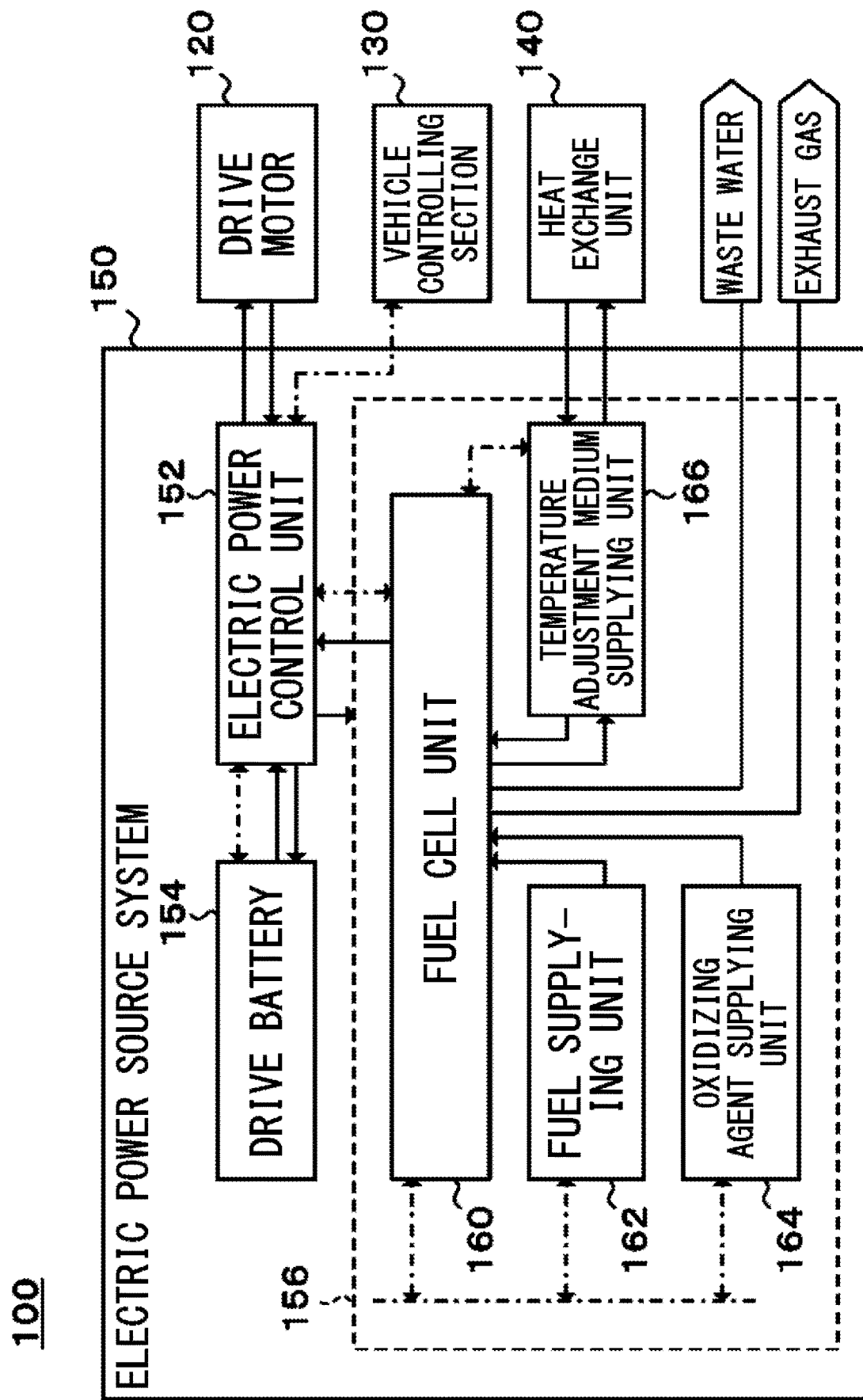
FIG. 1 schematically shows one example of the system arrangement of a vehicle 100.

FIG. 1 schematically shows one example of the system arrangement of the vehicle 100. In the present embodiment, the vehicle 100 includes a drive motor 120, a vehicle controlling section 130, a heat exchange unit 140, and an electric power source system 150. In the present embodiment, the electric power source system 150 includes an electric power control unit 152, a drive battery 154, and an electric power generation system 156. In the present embodiment, the electric power generation system 156 includes a fuel cell unit 160, a fuel supplying unit 162, an oxidizing agent supplying unit 164, and a temperature adjustment medium supplying unit 166.

In the present embodiment, the vehicle 100 carries out the work of transporting a person or an object (also referred to as a transport work in some cases). The vehicle 100 may carry out the transport work according to the manipulation by a driver or may carry out the transport work through automatic driving. It is noted that the work carried out by the vehicle 100 is not limited to the transport work. The vehicle 100 may carry out any work utilizing electric power.

In the present embodiment, the drive motor 120 drives the vehicle 100. The drive motor 120 drives the vehicle 100 by, for example, converting the electric power supplied from the electric power source system 150 into mechanical energy. Thereby, the vehicle 100 can carry out the transport work.

In the present embodiment, the vehicle controlling section 130 controls the operation of the vehicle 100. The vehicle controlling section 130 may control the operation of the vehicle 100 by controlling the operation of at least one of the drive motor 120, the heat exchange unit 140, and the electric power source system 150. The vehicle controlling section 130 controls, for example, the activation and stop timing, the rotation speed, the torque, and the like of the drive motor 120. The vehicle controlling section 130 controls, for example, the activation and stop timing, the heat exchange amount, the heat exchange rate, and the like of the heat exchange unit 140. The vehicle controlling section 130 controls, for example, the activation and stop timing, the output voltage, the output electric current, the output electric power, the output rate, and the like of the electric power source system 150.

The output rate of the electric power source system 150 may be the amount of electric power which can be output by the electric power source system 150 per unit time. The output rate of the electric power source system 150 may be the ratio of the amount of electric power which can be output by the electric power source system 150 per unit time to the rated value of the electric power supply capability of the electric power source system 150.

The duration of the unit time is not particularly limited. The duration of the unit time may be one second, may be one minute, may be n times longer than the operating cycle of the vehicle controlling section 130, or may be m times longer than the communication cycle between the vehicle controlling section 130 and the electric power source system 150, the n being an integer greater than or equal to one and the m being an integer greater than or equal to one.

In the present embodiment, the heat exchange unit 140 receives, from the temperature adjustment medium supplying unit 166 of the electric power generation system 156, temperature adjustment medium which is used to adjust the temperature of the fuel cell unit 160. The heat exchange unit 140 exchanges heat with the temperature adjustment medium to adjust the temperature of the temperature adjustment medium. The heat exchange unit 140 transfers, to the temperature adjustment medium supplying unit 166, the temperature adjustment medium for which the temperature has been adjusted. The heat exchange unit 140 may be a radiator.

In the present embodiment, the electric power source system 150 supplies electric power to each section of the vehicle 100. In the present embodiment, the electric power control unit 152 controls the operation of the electric power source system 150. The electric power control unit 152 may control the electric power source system 150 to supply electric power to each section of the vehicle 100. The electric power control unit 152 may operate according to the instruction from the vehicle controlling section 130. The detail of the electric power control unit 152 will be described below.

In the present embodiment, the drive battery 154 accumulates electric power. The drive battery 154 supplies, to each section of the vehicle 100, the electric power accumulated in the drive battery 154. The drive battery 154 may supply, to the electric power generation system 156, the electric power accumulated in the drive battery 154. The drive battery 154 may operate according to the instruction from the electric power control unit 152.

In the present embodiment, the electric power generation system 156 generates electric power. The electric power generation system 156 supplies, to each section of the vehicle 100, the electric power generated by the electric power generation system 156. The electric power generation system 156 may operate according to the instruction from the electric power control unit 152.

In the present embodiment, the fuel cell unit 160 utilizes the fuel supplied from the fuel supplying unit 162 and the fuel supplied from the oxidizing agent supplying unit 164 to generate electric power. The temperature of the fuel cell unit 160 is adjusted by the temperature adjustment medium supplied from the temperature adjustment medium supplying unit 166. The electric power generated by the fuel cell unit 160 is supplied, for example, via the electric power control unit 152 to each section of the vehicle 100. In the present embodiment, the fuel cell unit 160 may control the operation of at least one of the fuel supplying unit 162, the oxidizing agent supplying unit 164, and the temperature adjustment medium supplying unit 166. The fuel cell unit 160 may operate according to the instruction from the electric power control unit 152.

In the present embodiment, the fuel cell unit 160 may be a unit in which a controller controlling the fuel cell unit 160, a stack including a plurality of fuel cells, piping, and wiring are packaged. The constituent components of the fuel cell unit 160 may be accommodated in a single enclosure or may be accommodated separately in a plurality of enclosures.

The fuel cell unit 160 is a packaged unit so that the process in which the vehicle controlling section 130 or the electric power control unit 152 controls the electric power generation is simplified. As a result, for example, the process in which the inventor or designer of the vehicle 100 adjusts the operating point according to the characteristics of the stack may be omitted. For example, the vehicle controlling section 130 or the electric power control unit 152 can transmit, to the controller of the fuel cell unit 160, the instruction for outputting a predetermined electric power, the instruction for increasing the output electric power, or the instruction for reducing the output electric power, to control the output of the electric power generation system 156 without the consideration for the characteristics of the stack mounted in the fuel cell unit 160.

In addition, the vehicle controlling section 130 or the electric power control unit 152 can transmit, to the controller of the fuel cell unit 160, the instruction for selecting an operation mode, to control the operating point of the electric power generation system 156 without the consideration for the characteristics of the stack mounted in the fuel cell unit 160. The instruction for selecting the operation mode may be the instruction for switching the operating condition of the fuel cell unit 160. For example, the operation mode is associated with the operating condition which gives priority to one or more characteristics selected from the group consisting of (i) the amount of output electric power, (ii) the trackability or responsiveness to the output instruction, (iii) the fuel consumption or the efficiency of the electric power generation, and (iv) the suppression of the degradation, over other characteristics which are not selected.

In the present embodiment, the fuel cell unit 160 is attached to the vehicle 100 by, for example, being connected to the utility piping and the electric power cable arranged in the vehicle 100. The fuel cell unit 160 may be attached to the vehicle 100 by being connected to the utility piping, the electric power cable, and the communication cable arranged in the vehicle 100.

In one embodiment, the fuel cell unit 160 is attached to the vehicle 100 such that it cannot be easily removed by a general user of the vehicle 100. The fuel cell unit 160 is held at, for example, a predetermined position of the vehicle 100 or the electric power source system 150.

In another embodiment, the fuel cell unit 160 is attachably and detachably attached to the vehicle 100. Thereby, the general user of the vehicle 100 can attach, to another work machine, the fuel cell unit 160 removed from the vehicle 100 to actuate the other work machine with the electric power generated by the fuel cell unit 160. For example, the electric power source system 150 is configured to be attachable and detachable to and from the vehicle 100. The electric power generation system 156 may be configured to be attachable and detachable to and from the electric power source system 150. The fuel cell unit 160 may be configured to be attachable and detachable to and from the electric power generation system 156.

In the present embodiment, the fuel cell unit 160 determines the operating condition as appropriate according to the system arrangement of the electric power source system 150. When the fuel cell unit 160 has a plurality of operation modes, the fuel cell unit 160 may determine an operating condition for each operation mode. Specifically, the controller of the fuel cell unit 160 determines, based on (i) the specification required for the fuel cell unit 160 and (ii) the rated value of the capability of other parts constituting the electric power source system 150, at least one of (i) the output electric power or the output electric current of the fuel cell unit 160 and (ii) the output rate of the fuel cell unit 160. It is noted that the rated value may be a numerical value or may be a numerical range.

The output rate of the fuel cell unit 160 may be the amount of the electric power which can be output by the fuel cell unit 160 per unit time. The output rate of the fuel cell unit 160 may be the ratio of the amount of the electric power which can be output by the fuel cell unit 160 per unit time to the rated value of the electric power generation capability of the fuel cell unit 160.

The duration of the unit time is not particularly limited. The duration of the unit time may be one second, may be one minute, may be n times longer than the operating cycle of the vehicle controlling section 130, or may be m times longer than the communication cycle between the vehicle controlling section 130 and the electric power source system 150, the n being an integer greater than or equal to one and the m being an integer greater than or equal to one.

One Example of the Rated Value

In one embodiment, the fuel cell unit 160 obtains the information indicating the rated value of the charge and discharge capability of the drive battery 154 and, based on the information, determines the operating condition of the fuel cell unit 160. Examples of the rated value of the charge and discharge capability includes a rated capacity, a rated value of the C rate on charging, a rated value of the C rate on discharging, a rated output value for at least one of the SOC and the temperature, and the like. In this way, for example, the degradation of the fuel cell unit 160 on the activation of the fuel cell unit 160 may be inhibited. In addition, the occurrence of the failure in which the fuel cell unit 160 cannot be activated may be inhibited.

For the fuel cell unit 160 to be activated, at least the electric power used to activate the fuel supplying unit 162 and the oxidizing agent supplying unit 164 needs to be ensured. When the fuel cell unit 160 includes no storage battery, or when the fuel cell unit 160 includes the storage battery but the remaining capacity of the storage battery is low, the fuel cell unit 160 utilizes the electric power supplied from the drive battery 154 to activate the fuel supplying unit 162 and the oxidizing agent supplying unit 164.

In this case, it is assumed that the operation of the fuel cell unit 160 is controlled based on the current value of the remaining capacity or SOC of the drive battery 154. However, for example, when the rated capacity of the drive battery 154 is relatively small, there is a risk that the electric power for activating the fuel supplying unit 162 and the oxidizing agent supplying unit 164 cannot be ensured. Especially, since the oxidizing agent supplying unit 164 has a larger electric power consumption among the constituent components of the electric power generation system 156, there is a risk that the electric power for activating the oxidizing agent supplying unit 164 cannot be ensured. This also applies to the case in which another charge and discharge capability related to the drive battery 154 is insufficient.

In addition, in the present embodiment, the drive battery 154 is not included in the package of the fuel cell unit 160. Therefore, the specific value of the rated value of the charge and discharge capability of the drive battery 154 combined with the fuel cell unit 160 is unknown at the moment when the fuel cell unit 160 is designed or manufactured.

In view of this, according to the present embodiment, for example, after the order receipt and before the shipping of the fuel cell unit 160, or after the fuel cell unit 160 is attached to the vehicle 100 or the electric power source system 150, the fuel cell unit 160 obtains the information indicating the rated value of the charge and discharge capability of the drive battery 154 to be actually combined with the fuel cell unit 160 and, based on the rated value, determines the operating condition of the fuel cell unit 160. For example, the fuel cell unit 160 determines at least one of the operating condition on the activation of the fuel cell unit 160 and the operating condition on the stop of the fuel cell unit 160. In this way, for example, the degradation of the fuel cell unit 160 on the activation of the fuel cell unit 160 may be inhibited. In addition, the occurrence of the failure in which the fuel cell unit 160 cannot be activated may be inhibited.

The above described problem appears especially prominently (i) when the packaged fuel cell unit 160 includes no storage battery for driving the oxidizing agent supplying unit 164, (ii) when the ratio of the capacity [kWh] of the storage battery for driving the oxidizing agent supplying unit 164 to the electric power consumption [kW] of the oxidizing agent supplying unit 164 is relatively small (for example, lower than or equal to a predetermined value), or (iii) the ratio of the capacity [kWh] of the storage battery for driving the oxidizing agent supplying unit 164 to the electric power consumption amount [kWh] of the oxidizing agent supplying unit 164 on the activation of the fuel cell unit 160 is relatively small (for example, lower than or equal to a predetermined value). Therefore, in such a case, the present embodiment is especially useful.

It is noted that, for the inventor or designer of the vehicle 100 or the electric power source system 150, the catalog of the fuel cell unit 160 describes the rated value of the charge and discharge capability of the drive battery 154 and the precautions related to the remaining capacity of the drive battery 154 on the stop of the fuel cell unit 160 in some cases. Even in such a case, the fuel cell unit 160 obtains a specific value of the rated value of the charge and discharge capability of the drive battery 154 to be actually combined with the fuel cell unit 160 so that the fuel cell unit 160 can determine a more appropriate operating condition.

Another Example of the Rated Value

In another embodiment, the fuel cell unit 160 obtains the information indicating the rated value of the supply capability of the utility to be utilized for the operation of the fuel cell unit 160 and determines the operating condition of the fuel cell unit 160 based on the information. Examples of the utility include fuel, oxidizing agent, temperature adjustment medium, and the like. In this way, for example, the degradation of the fuel cell unit 160 may be inhibited. In addition, the effort may be significantly reduced for the inventor, designer, or user of the work machine.

For example, it is required that, during the operation of the fuel cell unit 160, the temperature of the stack is maintained within a predetermined range. However, in the present embodiment, the heat exchange unit 140 or the temperature adjustment medium supplying unit 166 is not included in the package of the fuel cell unit 160. Therefore, the specific value of the rated value of the capability with which the heat exchange unit 140 or the temperature adjustment medium supplying unit 166 adjusts the temperature of the temperature adjustment medium used to adjust the temperature of the fuel cell unit 160 is unknown at the moment when the fuel cell unit 160 is designed or manufactured.

In view of this, according to the present embodiment, for example, after the order receipt and before the shipping of the fuel cell unit 160, or after the fuel cell unit 160 is attached to the vehicle 100 or the electric power source system 150, the fuel cell unit 160 obtains the information indicating the rated value of the above described capability of the heat exchange unit 140 or the temperature adjustment medium supplying unit 166 and, based on the rated value, determines the operating condition of the fuel cell unit 160. In this way, during the operation of the fuel cell unit 160, the temperature of the stack may be managed more precisely. As a result, for example, the degradation of the fuel cell unit 160 may be inhibited. In addition, the effort may be significantly reduced for the inventor, designer, or user of the work machine.

It is noted that, for the inventor or designer of the vehicle 100 or the electric power source system 150, the catalog of the fuel cell unit 160 describes the precautions related to the specification of the heat exchange unit 140 or the temperature adjustment medium supplying unit 166 in some cases. Even in such a case, the fuel cell unit 160 obtains the specific value of the rated value of the capability of the heat exchange unit 140 or the temperature adjustment medium supplying unit 166 to be actually combined with the fuel cell unit 160 so that the fuel cell unit 160 can determine a more appropriate operating condition.

In the present embodiment, the fuel supplying unit 162 supplies the fuel for electric power generation to the fuel cell unit 160. The fuel for electric power generation may be hydrogen or may be a compound including hydrogen. The fuel supplying unit 162 may include a sensor used to measure the flow rate of the fuel (not shown) and a flow rate adjusting section used to adjust the flow rate of the fuel (not shown). The fuel supplying unit 162 may operate according to the instruction from the fuel cell unit 160.

In the present embodiment, the oxidizing agent supplying unit 164 supplies the oxidizing agent for electric power generation to the fuel cell unit 160. The oxidizing agent for electric power generation may be oxygen or may be the air. The oxidizing agent supplying unit 164 may include a sensor used to measure the flow rate of the oxidizing agent (not shown) and a flow rate adjusting section used to adjust the flow rate of the oxidizing agent (not shown). The oxidizing agent supplying unit 164 may operate according to the instruction from the fuel cell unit 160.

The oxidizing agent supplying unit 164 may have a pump or blower used to suck the air as the oxidizing agent from the outside of the electric power generation system 156. The oxidizing agent supplying unit 164 may be connected to the air supply piping (not shown) arranged in the vehicle 100.

In the present embodiment, the temperature adjustment medium supplying unit 166 supplies, to the fuel cell unit 160, the temperature adjustment medium for adjusting the temperature of the stack of the fuel cell unit 160. Examples of the temperature adjustment medium include water, ethylene glycol, long life coolant (also referred to as LLC in some cases) and the like. The temperature adjustment medium supplying unit 166 may include a sensor used to measure the flow rate of the temperature adjustment medium (not shown) and a flow rate adjusting section used to adjust the flow rate of the temperature adjustment medium (not shown). The temperature adjustment medium supplying unit 166 may operate according to the instruction from the fuel cell unit 160.

The vehicle 100 may be one example of the work machine and the external device. The drive motor 120 may be one example of the electric motor. The vehicle controlling section 130 may be one example of the computer mounted in the work machine. The heat exchange unit 140 may be one example of a heat exchanger. The electric power source system 150 may be one example of the electric power supply device. The drive battery 154 may be one example of the electric power source and the external electric power source. The electric power generation system 156 may be one example of the electric power supply device. The fuel cell unit 160 may be one example of the electric power supply device. The oxidizing agent supplying unit 164 may be one example of the oxidizing agent supplying section. The transport work may be one example of the work carried out by the work machine. The capability with which the heat exchange unit 140 or the temperature adjustment medium supplying unit 166 adjusts the temperature of the temperature adjustment medium may be one example of the supply capability of the utility.

It is noted that, in the present embodiment, the detail of the electric power source system 150 has been described using as an example the case in which the fuel cell unit 160 is the packaged unit. However, the electric power source system 150 is not limited to the present embodiment. In another embodiment, the electric power generation system 156 may be packaged. In yet another embodiment the electric power source system 150 may be packaged. In this case, the electric power control unit 152 may have a similar arrangement to the controller of the fuel cell unit 160.

In addition, in the present embodiment, the detail of the work machine which carries out the work has been described using as an example the case in which the vehicle 100 carries out the transport work. However, the work machine is not limited to the vehicle 100. The work machine may be the electric power source system 150 which carries out the work of accumulating electricity and the work of supplying electricity. In this case, the electric power source system 150 may be one example of the work machine and the external device, and the electric power control unit 152 may be one example of the computer mounted in the work machine. In addition, the work of accumulating electricity or the work of supplying electricity may be one example of the work carried out by the work machine.

Specific Arrangement of Each Section of the Vehicle 100

Each section of the vehicle 100 may be achieved by hardware, may be achieved by software or may be achieved by hardware and software. Each section of the vehicle 100 may be at least partially achieved by a single server or may be achieved by a plurality of servers. Each section of the vehicle 100 may be at least partially achieved on a virtual machine or a cloud system. Each section of the vehicle 100 may be at least partially achieved by a personal computer or a mobile terminal. Examples of mobile terminal include a mobile phone, a smart phone, a PDA, a tablet, a notebook computer or laptop computer, a wearable computer, and the like. Each section of the vehicle 100 may utilize a distributed ledger technology such as block chain, or a distributed network, to store information.

When at least a part of the components constituting the vehicle 100 is achieved by software, the component achieved by the software may be achieved by activating a program which defines the operation related to the component in an information processing apparatus with a general arrangement. The above described information processing apparatus includes, for example, (i) a data processing apparatus having a processor such as a CPU or a GPU, a ROM, a RAM, a communication interface, and the like, (ii) an input apparatus such as a keyboard, a touch panel, a camera, a microphone, various types of sensors, or a GPS receiver, (iii) an output apparatus such as a display apparatus, a speaker, or a vibration apparatus, and (iv) a storage device such as a memory or an HDD (including an external storage device).

In the above described information processing apparatus, the above described data processing apparatus or storage device may store a program. The above described program may be stored in a non-transitory computer readable recording medium. The above described program is executed by the processor, thereby causing the above described information processing apparatus to execute the operations prescribed by the program.

The program may be stored in a non-transitory computer readable recording medium. The program may also be stored in a computer-readable medium such as a CD-ROM, a DVD-ROM, a memory, a hard disk and the like, or may be stored in a storage device connected to a network. The program may be installed on a computer which constitutes at least a part of the vehicle 100, from a storage device connected to a computer-readable medium or network. When the program is executed, the computer may serve as at least part of each section of the vehicle 100.+

The program which causes a computer to serve as at least part of each section of the vehicle 100 may include a module which defines the operation of each section of the vehicle 100. These programs or modules regulate a data processing apparatus, an input apparatus, an output apparatus, a storage device, and the like to causes a computer to serve as each section of the vehicle 100 or causes the computer to perform an information processing method in each section of the vehicle 100.

The information processing described in the program serves as a specific means in which the software related to the program and the various hardware resources of the vehicle 100 cooperate when the program is read by the computer. Then, the above described specific means achieve a computation or process of the information according to the intended use of the computer in the present embodiment so that the vehicle 100 is constructed according to the intended use.

The above described program may be a program which causes a computer to serve as a controller for the fuel cell unit 160. The above described program may be a program which causes a computer to perform an information processing method in a controller of the fuel cell unit 160.

The above described information processing method may be a control method for controlling an electric power supply device which supplies electric power to a work machine. The electric power supply device includes, for example, a fuel cell and a utility connecting section for transferring, between the work machine and the electric power supply device, the utility to be utilized for the operation of the fuel cell. The above described control method includes, for example, a rated capability obtaining step to obtain the information indicating the rated value of the capability with which the work machine supplies the utility to the fuel cell in response to the electric power supply device being mounted in the work machine or the electric power supply device being able to utilize the utility. The above described control method includes, for example, an operating condition determining step to determine the operating condition of the electric power supply device based on the rated value.

The above described information processing method may be a control method to control the electric power supply device which supplies electric power to the work machine having an electric power source. The electric power supply device includes, for example, a fuel cell different from the electric power source, and an electric power connecting section for transferring electric power between the electric power source and the electric power supply device. The above described control method includes, for example, a rated capability obtaining step to obtain the information indicating the rated value of the charge and discharge capability of the electric power source in the work machine in response to the electric power supply device being mounted in the work machine or the electric power supply device being able to utilize the electric power of the electric power source. The above described control method includes, for example, an operating condition determining step to determine the operating condition of the electric power supply device based on the rated value.

Figure 2:
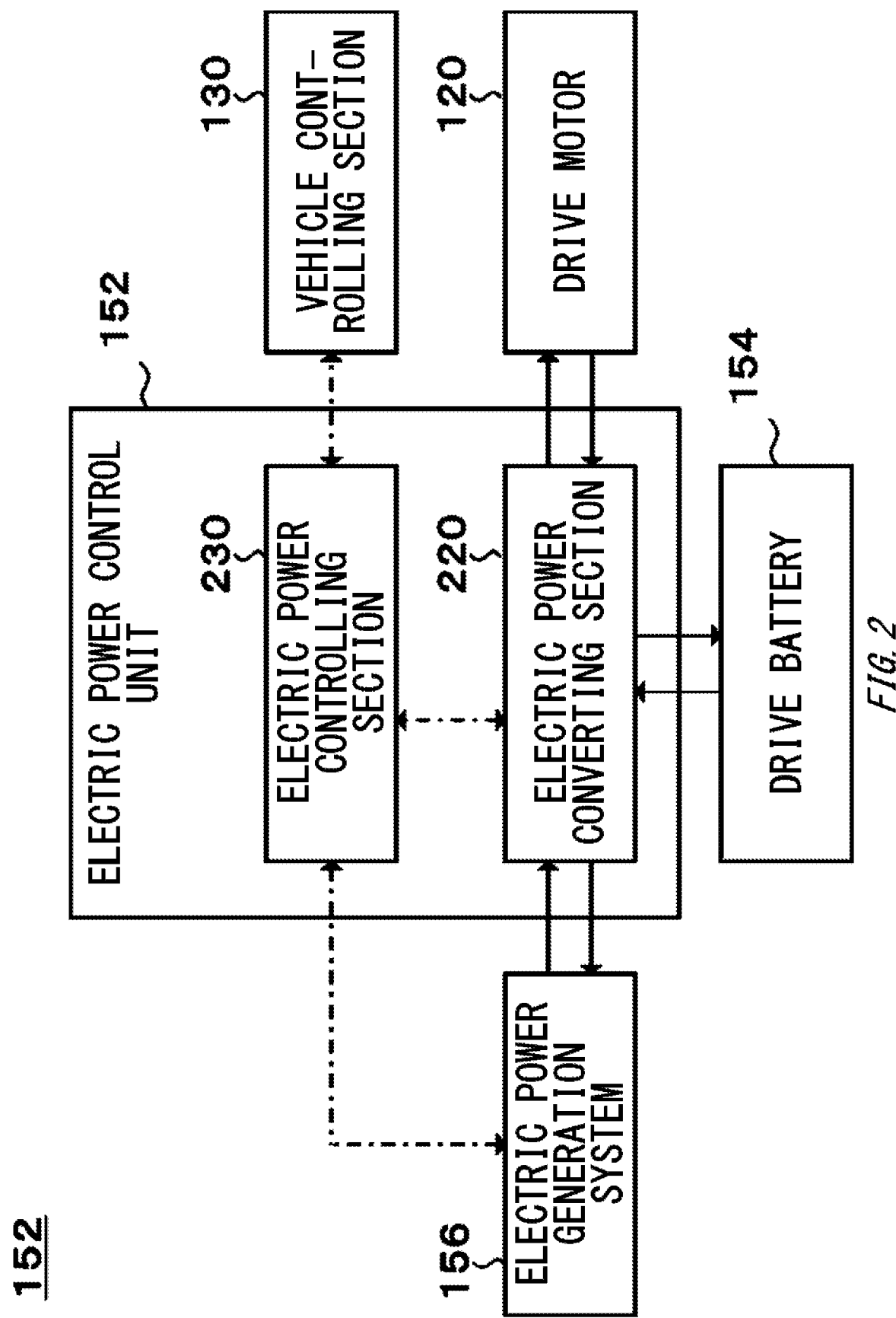
FIG. 2 schematically shows one example of the internal arrangement of an electric power control unit 152.

FIG. 2 schematically shows one example of the internal arrangement of the electric power control unit 152. In the present embodiment, the electric power control unit 152 includes an electric power converting section 220 and an electric power controlling section 230.

In the present embodiment, the electric power converting section 220 converts electric power. The electric power converting section 220 may convert direct current to alternating current, may convert alternating current to direct current, or may convert input DC voltage to another DC voltage. The electric power converting section 220 may include a bidirectional DC-DC convertor.

The electric power converting section 220 may switch the conducting state of the electric power. The electric power converting section 220 may switch the destination of the input electric power. The electric power converting section 220 may supply the electric power generated by the electric power generation system 156 to at least one of the drive motor 120 and the drive battery 154. The electric power converting section 220 may supply the electric power accumulated by the drive battery 154 to the drive motor 120. The electric power converting section 220 may supply the regenerative electric power from the drive motor 120 to the drive battery 154.

The electric power controlling section 230 controls the electric power converting section 220. The electric power controlling section 230 may control the electric power converting section 220 to convert the electric power. The electric power controlling section 230 may control the electric power converting section 220 to control the timing at which the supply of the electric power starts or stops. The electric power controlling section 230 may control the electric power converting section 220 to control the destination of the input electric power.

The electric power controlling section 230 may transmit and receive information to and from the vehicle controlling section 130. The electric power controlling section 230 may receive, from the vehicle controlling section 130, the instruction for controlling the operation of the electric power source system 150. The electric power converting section 220 may be controlled according to the instruction from the vehicle controlling section 130.

The electric power controlling section 230 may obtain the information related to the system arrangement of the vehicle 100 from the vehicle controlling section 130. The electric power controlling section 230 may store the information related to the system arrangement of the vehicle 100 in any recording medium. Examples of the information related to the system arrangement of the vehicle 100 include the information indicating the rated value of the regenerative electric power of the drive motor 120, the information indicating the rated value of the heat exchange capability of the heat exchange unit 140, the information indicating the rated value of the air supply capability to supply the air to the fuel cell unit 160, the information indicating the rated value of the capability to process the exhaust gas and the waste water from the fuel cell unit 160, the information indicating the rated loading amount of hydrogen, the information indicating the rated output of various loads mounted in the vehicle 100, the information indicating the rated electric power of a vehicle air conditioning equipment, and the like. Examples of the various loads mounted in the vehicle 100 include a motor used to drive the vehicle 100.

The electric power controlling section 230 may store the information related to the system arrangement of the electric power source system 150 in any recording medium. Examples of the information related to the system arrangement of the electric power source system 150 include the information indicating the rated value of the output electric power of the electric power source system 150, the information indicating the rated value of the electric power consumption of the fuel supplying unit 162, the information indicating the rated value of the fuel supply capability of the fuel supplying unit 162, the information indicating the rated value of the electric power consumption of the oxidizing agent supplying unit 164, the information indicating the rated value of the oxidizing agent supply capability of the oxidizing agent supplying unit 164, the information indicating the rated value of the electric power consumption of the temperature adjustment medium supplying unit 166, the information indicating the rated value of the temperature adjustment capability of the temperature adjustment medium supplying unit 166, the information indicating the rated value of the air supply capability to supply the air to the fuel cell unit 160, the information indicating the rated value of the capability to process the exhaust gas and the waste water from the fuel cell unit 160, the information indicating the rated output of the drive battery 154, the information indicating the rated capacity of the drive battery 154, the information indicating the rated output of the battery mounted in the fuel cell unit 160, the information indicating the rated capacity of the battery mounted in the fuel cell unit 160, and the like.

The electric power controlling section 230 may transmit and receive the information to and from the electric power generation system 156. The electric power controlling section 230 may transmit to the electric power generation system 156 the instruction for controlling the operation of the electric power generation system 156. The electric power controlling section 230 may generate the instruction for controlling the operation of the electric power generation system 156 based on the instruction from the vehicle controlling section 130.

The electric power controlling section 230 may receive, from the electric power generation system 156, the instruction for requesting the information related to the system arrangement of the vehicle 100 or the system arrangement of the electric power source system 150. The electric power controlling section 230 may transmit, to the electric power generation system 156, the above described information according to the instruction from the electric power generation system 156. The electric power controlling section 230 may obtain, from the electric power converting section 220, the information related to the electric power which passes through the electric power converting section 220.

It is noted that, in the present embodiment, the detail of the electric power generation system 156 is described using as an example the case in which the electric power generation system 156 transmits and receives the information to and from the vehicle controlling section 130 via the electric power control unit 152. However, the electric power generation system 156 is not limited to the present embodiment. In another embodiment, the electric power generation system 156 may transmit and receive the information to and from the vehicle controlling section 130 without the electric power control unit 152.

Figure 3:
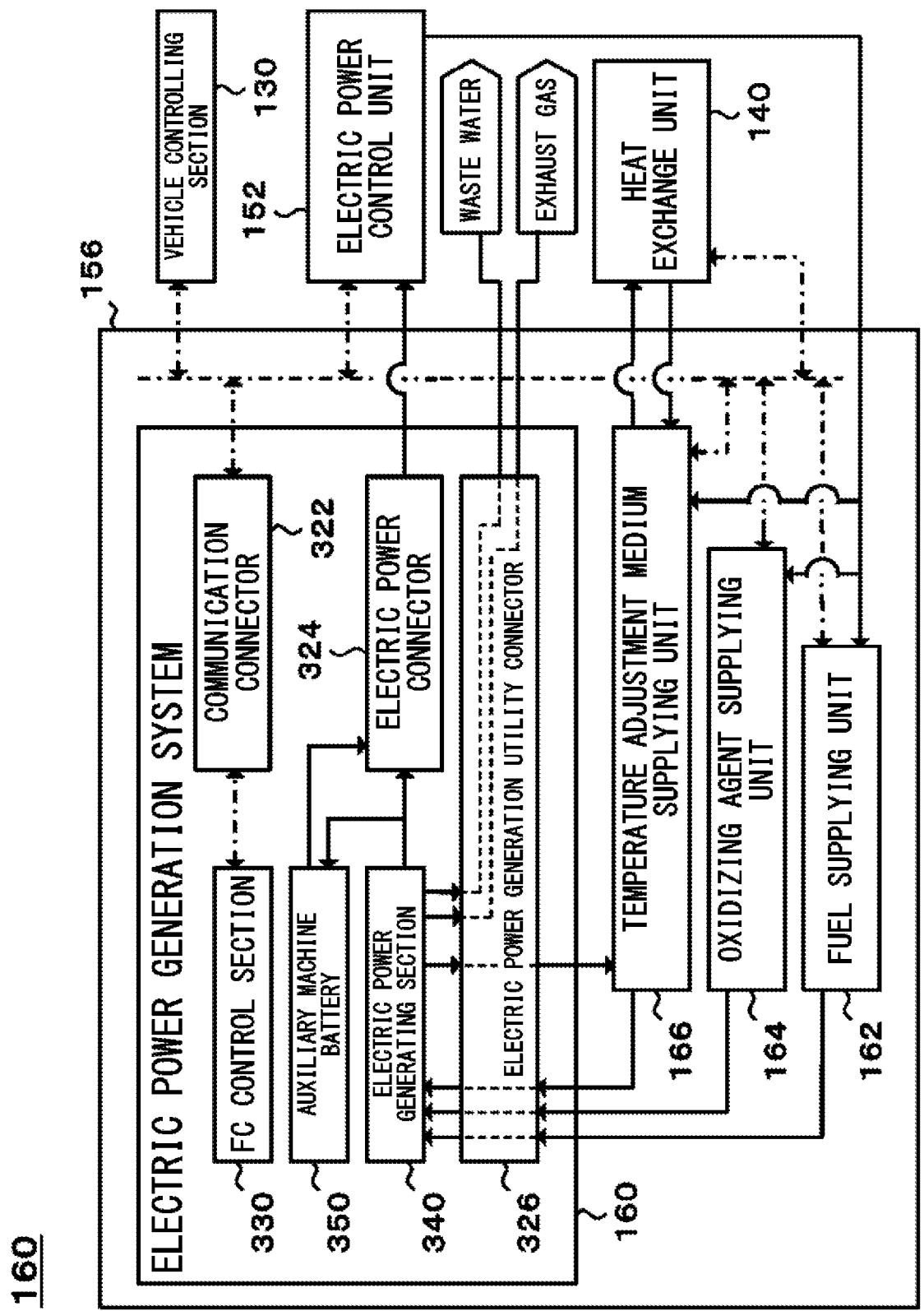
FIG. 3 schematically shows one example of the internal arrangement of a fuel cell unit 160.

FIG. 3 schematically shows one example of the internal arrangement of the fuel cell unit 160. In the present embodiment, the fuel cell unit 160 includes a communication connector 322, an electric power connector 324, and an electric power generation utility connector 326. In the present embodiment, the fuel cell unit 160 includes an FC control section 330, an electric power generating section 340, and an auxiliary machine battery 350.

As mentioned above, in the present embodiment, the fuel cell unit 160 is a packaged unit and is attached to the electric power generation system 156. Thus, the fuel cell unit 160 is mounted in the electric power source system 150 or the vehicle 100.

In the present embodiment, the communication connector 322 connects the communication cable arranged in the fuel cell unit 160 to the communication cable arranged in the electric power generation system 156. The communication cable arranged in the fuel cell unit 160 and the communication cable arranged in the electric power generation system 156 may be connected in a wired manner or wireless manner. The fuel cell unit 160 may transmit and receive information to and from the communication cable arranged in the electric power generation system 156, the electric power control unit 152, or the vehicle controlling section 130 via wireless communication equipment.

In the present embodiment, the electric power connector 324 electrically connects the electric power cable arranged in the fuel cell unit 160 to the electric power cable arranged in the electric power generation system 156. The electric power cable arranged in the fuel cell unit 160 and the electric power cable arranged in the electric power generation system 156 may be connected in a wired manner or wireless manner. The fuel cell unit 160 may be electrically connected to the electric power converting section 220 of the electric power control unit 152 or the drive motor 120 via wireless electric power supply equipment.

In this way, the electric power can be transferred between the electric power generation system 156 and the fuel cell unit 160. As a result, the electric power can be transferred between the electric power control unit 152 and the fuel cell unit 160, and the electric power can be transferred between the drive motor 120 or the drive battery 154 and the fuel cell unit 160.

In the present embodiment, the electric power generation utility connector 326 connects the utility piping arranged in the fuel cell unit 160 to the utility piping arranged in the electric power generation system 156. In this way, the utility to be utilized for the operation of the fuel cell unit 160 can be transferred between the electric power generation system 156 and the fuel cell unit 160. As a result, the utility can be transferred between the vehicle 100 or the electric power source system 150 and the fuel cell unit 160.

For example, the fuel can be transferred between the fuel supplying unit 162 and the fuel cell unit 160. The oxidizing agent can be transferred between the oxidizing agent supplying unit 164 and the fuel cell unit 160. The temperature adjustment medium or heat can be transferred between the temperature adjustment medium supplying unit 166 and the fuel cell unit 160. The heat can be transferred between the heat exchange unit 140 and the fuel cell unit 160 via the temperature adjustment medium supplying unit 166. In addition, the waste water and exhaust gas which are generated due to the electric power generation in the fuel cell unit 160 can be transferred between the fuel cell unit 160 and the vehicle 100.

In the present embodiment, the FC control section 330 controls the fuel cell unit 160. For example, the FC control section 330 controls the electric power generation of the fuel cell unit 160. The FC control section 330 may control at least one of the output voltage, the output electric current, the output electric power, and the output rate of the fuel cell unit 160. The FC control section 330 may control the operation of at least one of the fuel supplying unit 162, the oxidizing agent supplying unit 164 and the temperature adjustment medium supplying unit 166 to control the electric power generation of the fuel cell unit 160. The detail of the FC control section 330 will be described below.

In the present embodiment, the electric power generating section 340 generates electricity. The electric power generating section 340 may include a fuel cell. The fuel cell causes the fuel supplied from the fuel supplying unit 162 and the oxidizing agent supplied from the oxidizing agent supplying unit 164 to react with each other to generate electricity. The electric power generating section 340 may be electrically connected to the electric power connector 324. The electric power generating section 340 may be electrically connected to the auxiliary machine battery 350. The electric power generating section 340 may supply a part of the generated electricity to the auxiliary machine battery 350.

In the present embodiment, the auxiliary machine battery 350 accumulates the electric power used to activate at least one of the fuel supplying unit 162, the oxidizing agent supplying unit 164, and the temperature adjustment medium supplying unit 166. The auxiliary machine battery 350 may be electrically connected to the electric power connector 324. The auxiliary machine battery 350 may accumulate the electric power supplied from the electric power control unit 152. The auxiliary machine battery 350 may be electrically connected to the electric power generating section 340. The auxiliary machine battery 350 may accumulate the electric power supplied from the electric power generating section 340.

As mentioned above, for the fuel cell unit 160 to be activated, at least the electric power used to activate the fuel supplying unit 162 and the oxidizing agent supplying unit 164 needs to be ensured. Especially, the oxidizing agent supplying unit 164 often includes a fan used to pump the air as the oxidizing agent to the electric power generating section 340. However, the electric power consumption amount of the above described fan is relatively large. Thus, it is desirable to ensure the electric power used to actuate the oxidizing agent supplying unit 164 in preparation for the activation of the electric power generating section 340.

The rated capacity of the auxiliary machine battery 350 may be larger than the total of the minimum values of the electric power consumption amounts of the fuel supplying unit 162 and the oxidizing agent supplying unit 164 needed to activate the fuel cell unit 160. The rated capacity of the auxiliary machine battery 350 may be larger than the total of the minimum values of the electric power consumption amounts of the fuel supplying unit 162, the oxidizing agent supplying unit 164, and the temperature adjustment medium supplying unit 166 needed to activate the fuel cell unit 160. The rated capacity of the auxiliary machine battery 350 may be larger than the electric power consumption amount of the oxidizing agent supplying unit 164 needed to activate the fuel cell unit 160.

It is noted that the oxidizing agent supplying unit 164 may be configured to be actuated by the electric power supplied from the drive battery 154, upon the activation of the fuel cell unit 160. The oxidizing agent supplying unit 164 may also be configured to be actuated by the electric power supplied from the drive battery 154 and the electric power generated by the fuel cell unit 160, upon the activation of the fuel cell unit 160. The oxidizing agent supplying unit 164 may be configured to be actuated by the electric power supplied from the drive battery 154, upon the activation of the fuel cell unit 160, if the remaining capacity of the auxiliary machine battery 350 is outside of a predetermined numerical range. Subsequently, when the electric power generation amount of the electric power generating section 340 satisfies a predetermined condition, the oxidizing agent supplying unit 164 may be actuated by the electric power generated by the electric power generating section 340.

The electric power connector 324 may be one example of the electric power connecting section. The electric power generation utility connector 326 may be one example of the utility connecting section. The FC control section 330 may be one example of the control device. The auxiliary machine battery 350 may be one example of the activation electricity storage section.

Figure 4:
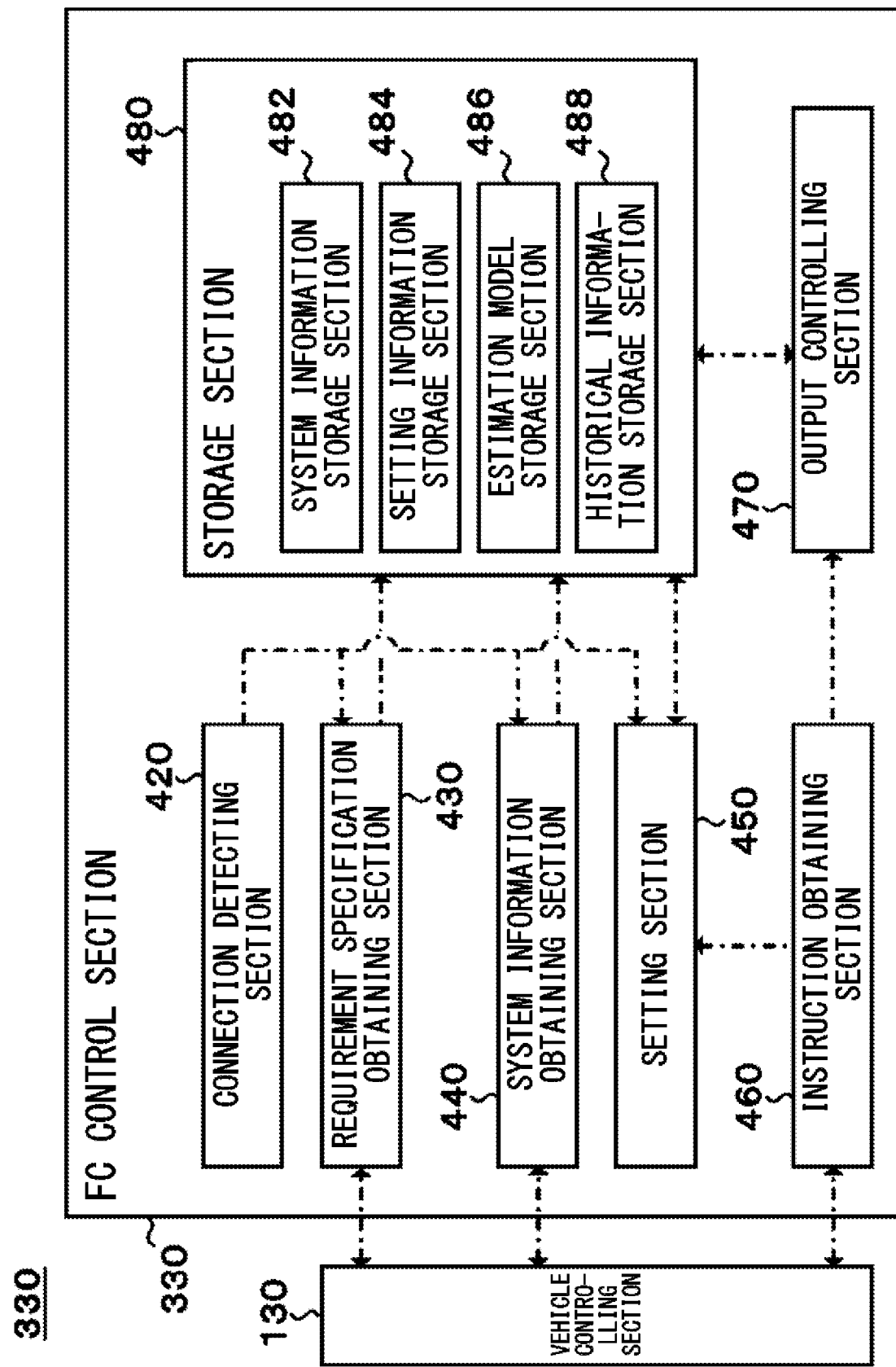
FIG. 4 schematically shows one example of the internal arrangement of an FC control section 330.

FIG. 4 schematically shows one example of the internal arrangement of the FC control section 330. In the present embodiment, the FC control section 330 includes a connection detecting section 420, a requirement specification obtaining section 430, a system information obtaining section 440, a setting section 450, an instruction obtaining section 460, an output controlling section 470, and a storage section 480. In the present embodiment, the storage section 480 includes a system information storage section 482, a setting information storage section 484, an estimation model storage section 486, and a historical information storage section 488.

In the present embodiment, the connection detecting section 420 detects that the fuel cell unit 160 has been attached to the electric power generation system 156. The connection detecting section 420 transmits the information indicating the detection result to, for example, the requirement specification obtaining section 430, the system information obtaining section 440, and the setting section 450.

The connection detecting section 420 may detect that the fuel cell unit 160 is able to utilize one or more utilities. The connection detecting section 420 transmits the information indicating the detection result to, for example, the requirement specification obtaining section 430, the system information obtaining section 440, and the setting section 450.

For example, the connection detecting section 420 detects that a certain utility is available by detecting that the electric power generation utility connector 326 has been connected to certain utility piping arranged in the electric power generation system 156. The connection detecting section 420 may detect that the utility is available when all the utility piping and the electric power generation utility connector 326 are connected. The connection detecting section 420 may detect that the utility is available when a certain type of utility piping and the electric power generation utility connector 326 are connected. The connection between the electric power generation utility connector 326 and the utility piping may be detected with any method.

The connection detecting section 420 may detect that the fuel cell unit 160 is able to utilize the electric power of the drive battery 154. For example, the connection detecting section 420 may detect that the fuel cell unit 160 is able to utilize the electric power of the drive battery 154 by detecting that the electric power connector 324 is connected to the electric power cable arranged in the electric power generation system 156. The connection between the electric power generation utility connector 326 and the electric power cable may be detected with any method. The connection detecting section 420 transmits the information indicating the detection result to, for example, the requirement specification obtaining section 430, the system information obtaining section 440, and the setting section 450.

The connection detecting section 420 may detect that the fuel cell unit 160 is able to output electric power. For example, the connection detecting section 420 may detect that the electric power is available for output by detecting that the electric power connector 324 has been connected to the electric power cable arranged in the electric power generation system 156. The connection between the electric power generation utility connector 326 and the electric power cable may be detected with any method. The connection detecting section 420 transmits the information indicating the detection result to, for example, the requirement specification obtaining section 430, the system information obtaining section 440, and the setting section 450.

In the present embodiment, the requirement specification obtaining section 430 obtains the information indicating the requirement specification related to the fuel cell unit 160. The requirement specification obtaining section 430 may access the vehicle controlling section 130 or the electric power controlling section 230 to obtain the above described information. When the requirement specification obtaining section 430 obtains, from the connection detecting section 420, at least one of the information indicating that the fuel cell unit 160 has been attached to the electric power generation system 156, the information indicating that the fuel cell unit 160 is able to utilize the utility, the information indicating that the fuel cell unit 160 is able to utilize the electric power of the drive battery 154, and the information indicating that the fuel cell unit 160 is able to output the electric power, it may obtain the above described information. The requirement specification obtaining section 430 may store the above described information in, for example, the setting information storage section 484.

Examples of the requirement specification include the warranty period, the service life or remaining life, the efficiency point, the possible output range, and the like of the cell or stack of the fuel cell unit 160. The requirement specification may include the information needed to calculate or estimate the requirement specification. Examples of the information needed to calculate or estimate the requirement specification include the type of the vehicle 100, the application of the vehicle 100, the total vehicle weight of the vehicle 100, the vehicle weight of the vehicle 100, the maximum loading capacity of the vehicle 100, the running resistance of the vehicle 100, and the like.

The requirement specification obtaining section 430 may determine the requirement specification based on the information needed to calculate or estimate the requirement specification. The requirement specification obtaining section 430 may determine the requirement specification with the estimation model stored in the estimation model storage section 486. The estimation model may be a function or a machine learning model in which the target variable is a certain type of the requirement specification and the explanatory variable is a certain type of information included in the requirement specification.

The requirement specification obtaining section 430 may obtain the information indicating at least one of the type and the application of the work machine. The information indicating at least one of the type and the application of the work machine may be one example of the information needed to calculate or estimate the requirement specification. Examples of the type of work machine include a motor vehicle, a train, a marine vessel, an aircraft, a heavy machine, a farm machine, and the like. Examples of the marine vessel may include a ship, a hovercraft, a personal watercraft, a submarine, a submersible, an underwater motor scooter and the like. Examples of the aircraft may include an airplane, an airship or a balloon, a hot air balloon, a helicopter, a drone and the like. Examples of the application of the work machine include a personal application, a corporate application, a transportation application, a construction application, an agricultural application, and the like.

In one embodiment, the requirement specification obtaining section 430 accesses the vehicle controlling section 130 or the electric power controlling section 230 to obtain the information indicating at least one of the type and the application of the work machine. In another embodiment, the requirement specification obtaining section 430 may access the vehicle controlling section 130 or the electric power controlling section 230 to obtain the information indicating the movement history of the vehicle 100 or the electric power source system 150. The movement history may be the information in which a time is associated with the position of the vehicle 100 or the electric power source system 150 at the time. The requirement specification obtaining section 430 may estimate at least one of the type and the application of the work machine based on the movement history of the vehicle 100 or the electric power source system 150.

In the present embodiment, the system information obtaining section 440 obtains the information related to at least one of the system arrangement of the vehicle 100 and the system arrangement of the electric power source system 150. The above described information may be the information indicating the rated value of the capability of the parts constituting at least one of the vehicle 100 and the electric power source system 150.

The system information obtaining section 440 may access the vehicle controlling section 130 or the electric power controlling section 230 to obtain the above described information. The system information obtaining section 440 may obtain the above described information by actuating the fuel cell unit 160 in a test mode for estimating various rated values. The system information obtaining section 440 may obtain the above described information by using the information obtained as a result of the test mode being performed and an estimation model. The estimation model may be a function or a machine learning model in which the target variable is a certain type of the rated value and the explanatory variable is the information obtained as a result of the test mode being performed.

The system information obtaining section 440 obtains, from the connection detecting section 420, at least one of the information indicating that the fuel cell unit 160 has been attached to the electric power generation system 156, the information indicating that the fuel cell unit 160 is able to utilize the utility, the information indicating that the fuel cell unit 160 is able to utilize the electric power of the drive battery 154, and the information indicating that the fuel cell unit 160 is able to output the electric power, it may obtain the above described information. The system information obtaining section 440 may store the above described information in, for example, the system information storage section 482.

As mentioned above, examples of the information related to the system arrangement of the vehicle 100 include the information indicating the rated value of the regenerative electric power of the drive motor 120, the information indicating the rated value of the heat exchange capability of the heat exchange unit 140, the information indicating the rated output of the motor which drives the vehicle 100, and the like. As mentioned above, examples of the information related to the system arrangement of the electric power source system 150 include the information indicating the rated value of the output electric power of the electric power source system 150, the information indicating the rated capacity of the drive battery 154, the information indicating the rated output of the drive battery 154, the information indicating the rated value of the C rate for the drive battery 154 being charged, the information indicating the rated value of the C rate for the drive battery 154 being discharged, the information indicating the rated value of the fuel supply capability of the fuel supplying unit 162, the information indicating the rated value of the oxidizing agent supply capability of the oxidizing agent supplying unit 164, the information indicating the rated value of the temperature adjustment capability of the temperature adjustment medium supplying unit 166, and the like. Examples of the rated value of the temperature adjustment capability of the temperature adjustment medium supplying unit 166 include the acceptable range of the flow rate of the temperature adjustment medium, the acceptable range of the supply temperature of the temperature adjustment medium, the acceptable range of the temperature difference between the supply temperature and the return temperature of the temperature adjustment medium, and the like.

In the present embodiment, the setting section 450 generates the setting information indicating the operating condition of the fuel cell unit 160. The setting section 450 may generate the setting information based on the information related to various requirement specification obtained by the requirement specification obtaining section 430, and the information related to the various rated value obtained by the system information obtaining section 440. The setting section 450 may store the setting information in, for example, the setting information storage section 484.

In one embodiment, the setting section 450 generates setting information when it obtains from the connection detecting section 420 at least one of the information indicating that the fuel cell unit 160 has been attached to the electric power generation system 156 and the information indicating that the fuel cell unit 160 is able to utilize the utility. The setting section 450 may generate the setting information based on the information related to the requirement specification of the fuel cell unit 160 and the information related to the rated value of the utility of the fuel cell unit 160. The setting section 450 may generate the setting information based on the information related to the requirement specification of the fuel cell unit 160, the information related to the rated value of the utility of the fuel cell unit 160, and the information indicating the progress status of the degradation of the fuel cell unit 160 (also referred to as degradation degree in some cases).

The setting section 450 may obtain the degradation degree of the fuel cell unit 160 based on the electric power generation history of the fuel cell unit 160. The setting section 450 may obtain the degradation degree by using the electric power generation history and the estimation model. The estimation model may be the function or machine learning model in which the target variable is the degradation degree and the explanatory variable is the information included in the electric power generation history.

The setting section 450 may also obtain the degradation degree of the fuel cell unit 160 by actuating the fuel cell unit 160 in the test mode for estimating the degradation degree. The setting section 450 may obtain the above described information by using the information obtained as a result of the test mode being performed and the estimation model. The estimation model may be a function or a machine learning model in which the target variable is the degradation degree and the explanatory variable is the information obtained as a result of the test mode being performed.

In another embodiment, when the setting section 450 obtains from the connection detecting section 420 at least one of the information indicating that the fuel cell unit 160 has been attached to the electric power generation system 156 and the information indicating that the fuel cell unit 160 is able to utilize the drive battery 154, it generates setting information. The setting section 450 may generate the setting information based on the information related to the requirement specification of the fuel cell unit 160 and the information related to the rated value of the charge and discharge capability of the drive battery 154. The setting section 450 may generate the setting information based on the information related to the requirement specification of the fuel cell unit 160, the information related to the rated value of the charge and discharge capability of the drive battery 154, and the degradation degree.

In another embodiment, when the setting section 450 obtains from the instruction obtaining section 460 the instruction for updating the setting information, it generates the setting information. The setting section 450 may generate new setting information based on the current value of the remaining life of the fuel cell unit 160. The setting section 450 may estimate the current value of the remaining life based on the current value of the degradation degree. The setting section 450 may estimate the current value of the remaining life using the current value of the degradation degree and the estimation model. The estimation model may be the function or machine learning model in which the target variable is the remaining life and the explanatory variable is the degradation degree. The detail of the setting section 450 will be described below.

In the present embodiment, the instruction obtaining section 460 obtains the instruction which is from the vehicle controlling section 130 or the electric power controlling section 230. The instruction obtaining section 460 transmits, to at least one of the instruction obtaining section 460 and the output controlling section 470, the instruction which is from the vehicle controlling section 130 or the electric power controlling section 230.

In one embodiment, the instruction obtaining section 460 obtains, from the vehicle controlling section 130 or the electric power controlling section 230, the instruction for updating the setting information of the fuel cell unit 160. Upon receiving the above described instruction, the instruction obtaining section 460 transmits the instruction to the setting section 450.

In another embodiment, the instruction obtaining section 460 obtains, from the vehicle controlling section 130 or the electric power controlling section 230, the instruction for controlling the operation of the fuel cell unit 160. Upon receiving the above described instruction, the instruction obtaining section 460 transmits the instruction to the output controlling section 470.

Examples of the instruction for controlling the operation of the fuel cell unit 160 include the instruction for controlling the output of the fuel cell unit 160, the instruction for switching the operation mode of the fuel cell unit 160, and the like. Examples of the instruction for controlling the output of the fuel cell unit 160 include the instruction for activating the fuel cell unit 160, the instruction for specifying or increasing/reducing at least one of the output voltage, output electric current, output electric power and output rate of the fuel cell unit 160, the instruction for stopping the fuel cell unit 160, and the like. Examples of the instruction for specifying or increasing/reducing the output rate may include the instruction for specifying or increasing/reducing at least one of the rate of the output electric current and the rate of the output electric power.

In the present embodiment, the output controlling section 470 controls the output of the fuel cell unit 160. The output controlling section 470 may control the output of the fuel cell unit 160 when it obtains from the instruction obtaining section 460 the instruction for controlling the operation of the fuel cell unit 160. The detail of the output controlling section 470 will be described below.

In the present embodiment, the storage section 480 stores various information used for the information processing of the FC control section 330. The storage section 480 may store various information obtained through the information processing of the FC control section 330.

In the present embodiment, the system information storage section 482 stores the information obtained by the system information obtaining section 440. In the present embodiment, the setting information storage section 484 stores the information obtained by the requirement specification obtaining section 430. The setting information storage section 484 may store the setting information generated by the setting section 450. In the present embodiment, the estimation model storage section 486 stores various estimation models. In the present embodiment, the historical information storage section 488 stores various pieces of historical information. For example, the historical information storage section 488 stores the historical information related to the electric power generation of the fuel cell unit 160. The historical information storage section 488 may store the historical information related to the degradation of the fuel cell unit 160.

The connection detecting section 420 may be one example of the detecting section. The requirement specification obtaining section 430 may be one example of the target determining section. The system information obtaining section 440 may be one example of the rated capability obtaining section. The setting section 450 may be one example of the control device, the rated capability obtaining section, and the operating condition determining section. The requirement specification may be one example of the target.

Figure 5:
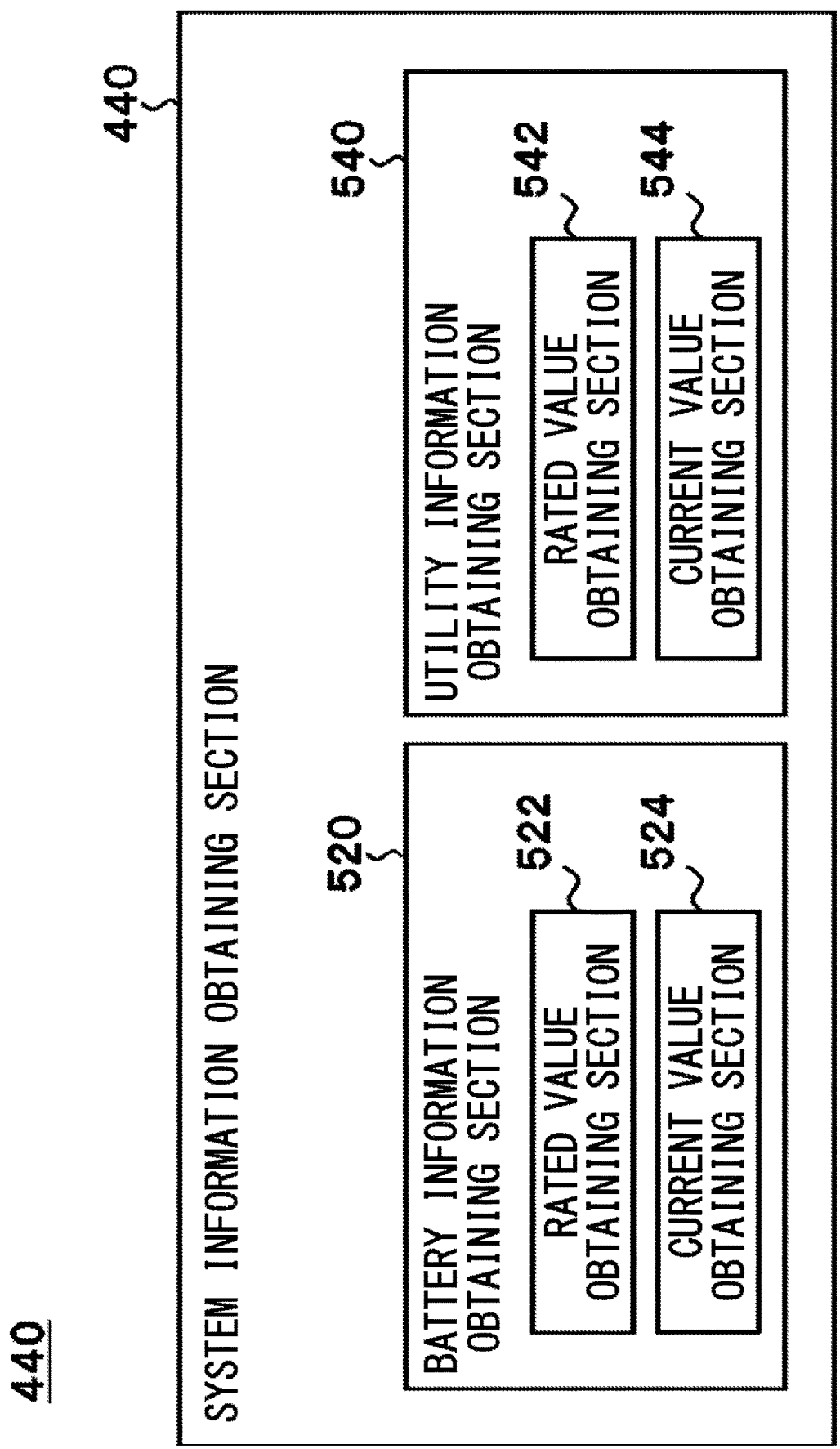
FIG. 5 schematically shows one example of the internal arrangement of a system information obtaining section 440.

FIG. 5 schematically shows one example of the internal arrangement of the system information obtaining section 440. In the present embodiment, the system information obtaining section 440 includes a battery information obtaining section 520 and a utility information obtaining section 540. In the present embodiment, the battery information obtaining section 520 has a rated value obtaining section 522 and a current value obtaining section 524. In the present embodiment, the utility information obtaining section 540 includes a rated value obtaining section 542 and a current value obtaining section 544.

In the present embodiment, the battery information obtaining section 520 obtains the information related to the external electric power source available for the fuel cell unit 160. Specifically, the battery information obtaining section 520 obtains the information related to the drive battery 154. The battery information obtaining section 520 stores the information related to the drive battery 154 in, for example, the system information storage section 482.

In the present embodiment, the rated value obtaining section 522 obtains the information indicating the rated value of the charge and discharge capability of the drive battery 154. In one embodiment, the rated value obtaining section 522 performs the process to obtain the information indicating the rated value of the charge and discharge capability of the drive battery 154 when it receives, from the connection detecting section 420, at least one of the information indicating that the fuel cell unit 160 has been attached to the electric power generation system 156 and the information indicating that the fuel cell unit 160 is able to utilize the drive battery 154. In this way, the rated value obtaining section 522 can obtain the information indicating the rated value of the charge and discharge capability of the drive battery 154 in response to the fuel cell unit 160 being mounted in the vehicle 100 or the electric power source system 150 or the fuel cell unit 160 being able to utilize the electric power of the drive battery 154.

In one embodiment, the process for obtaining the information indicating the rated value of the charge and discharge capability of the drive battery 154 includes a procedure to access the vehicle controlling section 130 or the electric power controlling section 230 to obtain the information. In another embodiment, the process to obtain the information indicating the rated value of the charge and discharge capability of the drive battery 154 includes a procedure to access the vehicle controlling section 130 or the electric power controlling section 230 to obtain the identification information of the vehicle 100 or the electric power source system 150 and the procedure to access the storage device which stores the identification information of the vehicle 100 or the electric power source system 150 and the information related to the system arrangement of the vehicle 100 or the electric power source system 150 which are associated with each other, and obtain the information indicating the rated value of the charge and discharge capability of the drive battery 154 associated with the identification information obtained through the above described procedure. In another embodiment, the process to obtain the information indicating the rated value of the charge and discharge capability of the drive battery 154 includes the procedure to obtain the information by actuating the fuel cell unit 160 in the test mode for estimating the above described rated value.

In the present embodiment, the current value obtaining section 524 obtains the current value of the charge and discharge capability of the drive battery 154. Examples of the current value of the charge and discharge capability of the drive battery 154 include the current value of the remaining capacity or the SOC, the current value of the C rate on charging, the current value of the C rate on discharging, the current value of the degradation degree indicating the progress status of the degradation, and the like.

The current value obtaining section 524 may obtain the current value of the charge and discharge capability of the drive battery 154 at any timing or at a predetermined timing. When the instruction obtaining section 460 obtains, from the vehicle controlling section 130 or the electric power controlling section 230, the instruction for updating the setting information, the current value obtaining section 524 may obtain the current value of the charge and discharge capability of the drive battery 154.

In the present embodiment, the utility information obtaining section 540 obtains the information related to the utility to be utilized for the operation of the fuel cell unit 160. Specifically, the information related to the supply of the above described utility is obtained. The utility information obtaining section 540 stores the information related to the utility in, for example, the system information storage section 482.

In the present embodiment, the rated value obtaining section 542 obtains the information indicating the rated value of the capability with which the vehicle 100, the electric power source system 150, or the electric power generation system 156 supplies various utility to the fuel cell unit 160 (also referred to as utility supply capability in some cases). In one embodiment, the rated value obtaining section 542 performs the process to obtain the rated value of the utility supply capability when it receives, from the connection detecting section 420, at least one of the information indicating that the fuel cell unit 160 has been attached to the electric power generation system 156 and the information indicating that the fuel cell unit 160 is able to utilize the utility. In this way, the rated value obtaining section 542 can obtain the information indicating the rated value of the utility supply capability in response to the fuel cell unit 160 or the vehicle 100 being mounted in the electric power source system 150 or the fuel cell unit 160 being able to utilize the utility.

In one embodiment, the process to obtain the information indicating the rated value of the utility supply capability includes the procedure to access the vehicle controlling section 130 or the electric power controlling section 230 to obtain the information. In another embodiment, the process to obtain the information indicating the rated value of the utility supply capability includes a procedure to access the vehicle controlling section 130 or the electric power controlling section 230 to obtain the identification information of the vehicle 100 or the electric power source system 150 and the procedure to access the storage device which stores the identification information of the vehicle 100 or the electric power source system 150 and the information related to the system arrangement of the vehicle 100 or the electric power source system 150 which are associated with each other, and obtain the information indicating the rated value of the utility supply capability associated with the identification information obtained through the above described procedure. In another embodiment, the process to obtain the information indicating the rated value of the utility supply capability includes the procedure to obtain the information by actuating the fuel cell unit 160 in the test mode for estimating the above described rated value.

In the present embodiment, the current value obtaining section 544 obtains the current value of the utility supply capability. The current value obtaining section 544 may obtain the current value of the utility supply capability at any timing or a predetermined timing. When the instruction obtaining section 460 obtains, from the vehicle controlling section 130 or the electric power controlling section 230, the instruction for updating the setting information, the current value obtaining section 544 may obtain the current value of the utility supply capability.

The battery information obtaining section 520 may be one example of the rated capability obtaining section. The rated value obtaining section 522 may be one example of the rated capability obtaining section. The utility information obtaining section 540 may be one example of the rated capability obtaining section. The rated value obtaining section 542 may be one example of the rated capability obtaining section.

Figure 6:
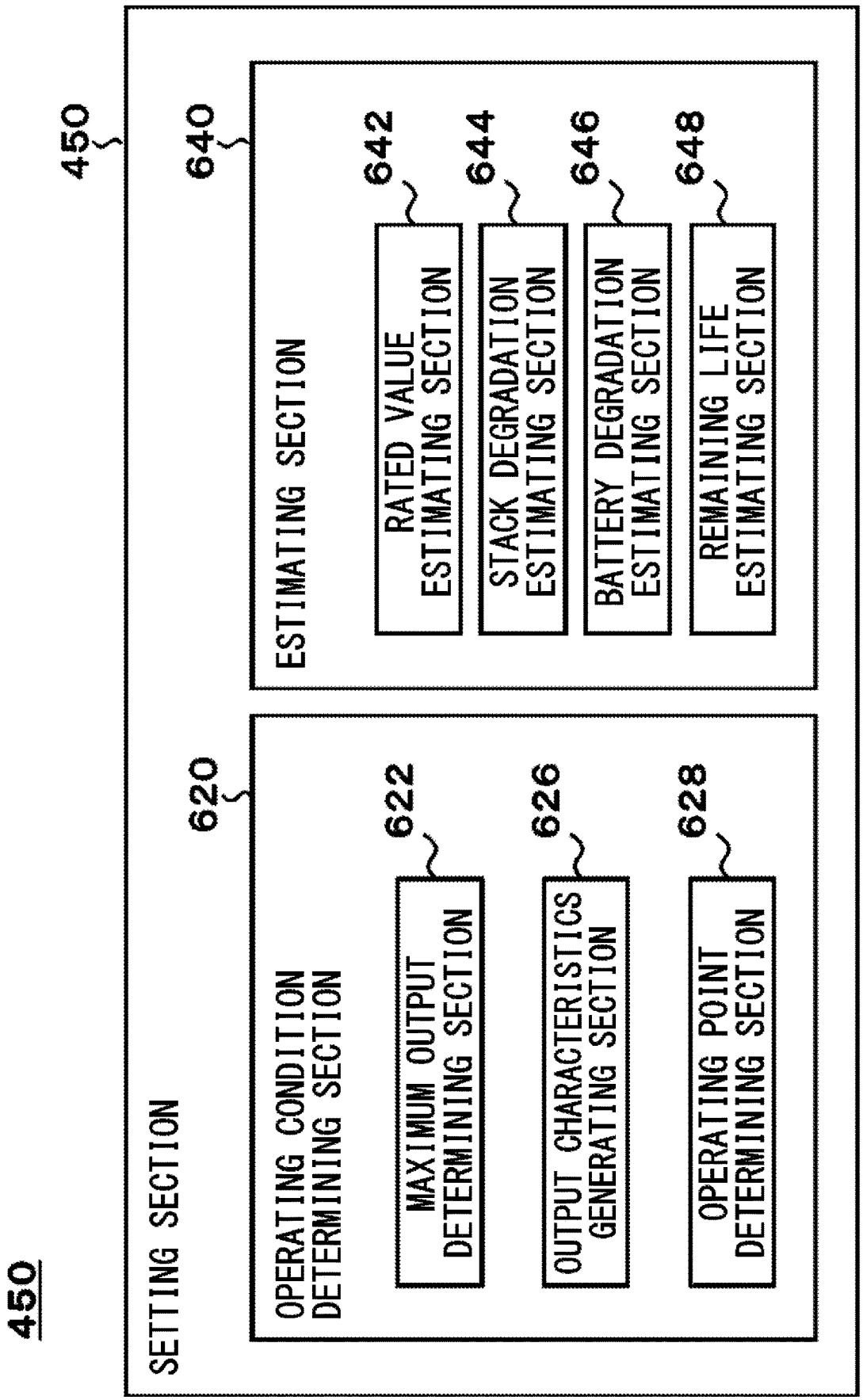
FIG. 6 schematically shows one example of the internal arrangement of a setting section 450.

FIG. 6 schematically shows one example of the internal arrangement of the setting section 450. In the present embodiment, the setting section 450 includes an operating condition determining section 620 and an estimating section 640. In the present embodiment, the operating condition determining section 620 includes a maximum output determining section 622, an output characteristics generating section 626, and an operating point determining section 628. In the present embodiment, the estimating section 640 includes a rated value estimating section 642, a stack degradation estimating section 644, a battery degradation estimating section 646, and a remaining life estimating section 648.

In the present embodiment, the operating condition determining section 620 determines the operating condition of the fuel cell unit 160. Based on the determined operating condition, the operating condition determining section 620 may generate the output characteristics of the fuel cell unit 160 under the operating condition. The operating condition determining section 620 may determine the appropriate operating point within the range of the determined operating condition.

In one embodiment, when the operating condition determining section 620 obtains from the connection detecting section 420 at least one of the information indicating that the fuel cell unit 160 has been attached to the electric power generation system 156, the information indicating that the fuel cell unit 160 is able to utilize the drive battery 154, and the information indicating that the fuel cell unit 160 is able to utilize the utility, it determines the initial value of the operating condition of the fuel cell unit 160. In another embodiment, when the operating condition determining section 620 obtains, from the instruction obtaining section 460, the instruction for updating the setting information, it determines the updated value of the operating condition of the fuel cell unit 160.

In the present embodiment, the maximum output determining section 622 determines the maximum output of the fuel cell unit 160. The maximum output may be the same as the rated output or may be smaller than the rated output. Examples of the maximum output include the maximum value of the output voltage, the maximum value of the output electric current, the maximum value of the output electric power, the maximum value of the output rate, and the like. The maximum output determining section 622 may transmit, to at least one of the vehicle controlling section 130 and the electric power controlling section 230, the information indicating the maximum output of the fuel cell unit 160.

The Procedure to Determine the Initial Value of the Maximum Output

In one embodiment, the maximum output determining section 622 obtains, from the connection detecting section 420, at least one of the information indicating that the fuel cell unit 160 has been attached to the electric power generation system 156 and the information indicating that the fuel cell unit 160 is able to utilize the drive battery 154. In this case, the maximum output determining section 622 determines the initial value of the maximum output, for example, according to the following procedure.

First, the maximum output determining section 622 determines the target related to the warranty period, the service life, or the remaining life of the cell or stack of the fuel cell unit 160. For example, the maximum output determining section 622 refers to the setting information storage section 484 to obtain the information related to the requirement specification for the fuel cell unit 160, and determines the requirement specification as the above described target.

Then, the maximum output determining section 622 obtains the information indicating the rated value of the charge and discharge capability of the drive battery 154. For example, the maximum output determining section 622 refers to the system information storage section 482 to obtain the information indicating the rated value of the charge and discharge capability of the drive battery 154. The maximum output determining section 622 may obtain the estimation result of the rated value estimating section 642 as the information indicating the rated value of the charge and discharge capability of the drive battery 154.

Then, the maximum output determining section 622 determines the maximum output of the fuel cell unit 160. For example, the maximum output determining section 622 determines the maximum output of the fuel cell unit 160 based on the rated value of the charge and discharge capability of the drive battery 154 and the target related to the above described warranty period and the like. The maximum output determining section 622 may determine the maximum output of the fuel cell unit 160 based on (i) the relationship between the rated value of the charge and discharge capability of the drive battery 154 and the degradation degree of the fuel cell unit 160 and (ii) the relationship between the degradation degree of the fuel cell unit 160 and the warranty period and the like of the fuel cell unit 160. The maximum output determining section 622 may determine the maximum output of the fuel cell unit 160 using the function or machine learning model in which the target variable is the maximum output of the fuel cell unit 160, and the explanatory variable is the warranty period and the like of the fuel cell unit 160 and the rated value of the charge and discharge capability of the drive battery 154.

In this way, the maximum output of the fuel cell unit 160 is determined so that the target related to the warranty period and the like can be achieved. For example, the maximum output of the fuel cell unit 160 is determined such that the maximum output of the fuel cell unit 160 decreases as the rated value of the charge and discharge capability of the drive battery 154 decreases. For example, the maximum output of the fuel cell unit 160 is determined such that the maximum output of the fuel cell unit 160 decreases as the target of the warranty period and the like increases.

When the rated value of the charge and discharge capability of the drive battery 154 satisfies a predetermined condition, the FC control section 330 may determine to continue the electric power generation for a predetermined period after receiving the instruction for stopping the fuel cell unit 160. The electric power generation amount during the above described period may be smaller than that during the usual electric power generation. This increases the remaining capacity of the drive battery 154. Examples of the predetermined condition include the condition that the ratio of the rated capacity or the rated value of the discharging capability of the drive battery 154 to the electric power consumption or the electric power consumption amount during the activation period of the oxidizing agent supplying unit 164 is outside of a predetermined numerical range.

In another embodiment, the maximum output determining section 622 obtains from the connection detecting section 420 at least one of the information indicating that the fuel cell unit 160 has been attached to the electric power generation system 156 and the information indicating that the fuel cell unit 160 is able to utilize the utility. In this case, the maximum output determining section 622 determines the initial value of the maximum output, for example, according to the following procedure.

The maximum output determining section 622 first determines the target related to the warranty period, service life, or remaining life of the cell or stack of the fuel cell unit 160. For example, the maximum output determining section 622 refers to the setting information storage section 484 to obtain the information related to the requirement specification for the fuel cell unit 160, and determines the requirement specification as the above described target.

Then, the maximum output determining section 622 obtains the information indicating the rated value of the utility supply capability. For example, the maximum output determining section 622 refers to the system information storage section 482 to obtain the information indicating the rated value of the utility supply capability. The maximum output determining section 622 may obtain the estimation result of the rated value estimating section 642 as the information indicating the rated value of the utility supply capability.

Then, the maximum output determining section 622 determines the maximum output of the fuel cell unit 160. For example, the maximum output determining section 622 determines the maximum output of the fuel cell unit 160 based on the rated value of the utility supply capability and the target related to the above described warranty period and the like. The maximum output determining section 622 may determine the maximum output of the fuel cell unit 160 based on (i) the relationship between the rated value of the utility supply capability and the degradation degree of the fuel cell unit 160 and (ii) the relationship between the degradation degree of the fuel cell unit 160 and the warranty period and the like of the fuel cell unit 160. The maximum output determining section 622 may determine the maximum output of the fuel cell unit 160 using the function or machine learning model in which the target variable is the maximum output of the fuel cell unit 160, and the explanatory variable is the warranty period and the like of the fuel cell unit 160 and the rated value of the utility supply capability.

In this way, the maximum output of the fuel cell unit 160 is determined so that the target related to the warranty period and the like can be achieved. For example, the maximum output of the fuel cell unit 160 is determined such that the maximum output of the fuel cell unit 160 decreases as the rated value of the utility supply capability decreases. For example, the maximum output of the fuel cell unit 160 is determined such that the maximum output of the fuel cell unit 160 decreases as the target of the warranty period and the like increases.

It is noted that the method with which the maximum output determining section 622 determines the maximum output is not limited to the present embodiment. In another embodiment, the maximum output determining section 622 may determine, through the similar procedure, the maximum output of the fuel cell unit 160 based on the rated value of the utility supply capability and the rated value of the charge and discharge capability of the drive battery 154, and the target related to the above described warranty period and the like.

The Procedure to Determine the Updated Value of the Maximum Output

In one embodiment, the maximum output determining section 622 obtains the instruction for updating the setting information from the instruction obtaining section 460. In this case, the maximum output determining section 622 determines the updated value of the maximum output according to, for example, the procedure described below.

The maximum output determining section 622 first determines the target related to the warranty period, service life or remaining life of the cell or stack of the fuel cell unit 160. In one embodiment, the maximum output determining section 622 determines the above described target such that the warranty period and the like after update match the warranty period and the like before update. In another embodiment, the maximum output determining section 622 determines the above described target such that the warranty period and the like after update is longer than the warranty period and the like before update.

The maximum output determining section 622 then obtains the information indicating the current degradation degree of the fuel cell unit 160 from the stack degradation estimating section 644. In addition, the maximum output determining section 622 obtains the information indicating the rated value of the charge and discharge capability of the drive battery 154. The maximum output determining section 622 may obtain the information indicating the rated value of the charge and discharge capability of the drive battery 154 through the similar procedure to the procedure with which the initial value of the maximum output is determined.

The maximum output determining section 622 then determines the maximum output of the fuel cell unit 160. For example, the maximum output determining section 622 determines the maximum output of the fuel cell unit 160 based on the rated value of the charge and discharge capability of the drive battery 154, the target related to the above described warranty period and the like, and the current degradation degree of the fuel cell unit 160. The maximum output determining section 622 may determine the maximum output of the fuel cell unit 160 based on (i) the relationship between the rated value of the charge and discharge capability of the drive battery 154 and the degradation degree of the fuel cell unit 160 and (ii) the relationship between the degradation degree of the fuel cell unit 160 and the warranty period and the like of the fuel cell unit 160, and the like. The maximum output determining section 622 may determine the maximum output of the fuel cell unit 160 using the function or machine learning model in which the target variable is the maximum output of the fuel cell unit 160, and the explanatory variable is the warranty period and the like of the fuel cell unit 160, the rated value of the charge and discharge capability of the drive battery 154, and the degradation degree of the fuel cell unit 160.

Similarly, the maximum output determining section 622 may determine the maximum output of the fuel cell unit 160 based on the rated value of the charge and discharge capability of the drive battery 154, the target related to the above described warranty period and the like, the current degradation degree of the fuel cell unit 160, and the degradation degree of the drive battery 154. The maximum output determining section 622 may obtain the information indicating the current degradation degree of the drive battery 154 from the battery degradation estimating section 646.

In this way, the maximum output of the fuel cell unit 160 is determined so that the target related to the warranty period and the like can be achieved in consideration of the degree of the degradation of the fuel cell unit 160. In addition, the maximum output of the fuel cell unit 160 is determined such that the performance of the fuel cell unit 160 can be maintained for a period longer than the initial warranty period and the like.

In another embodiment, the maximum output determining section 622 obtains the instruction for updating the setting information from the instruction obtaining section 460. In this case, the maximum output determining section 622 determines the updated value of the maximum output according to, for example, the procedure described below.

The maximum output determining section 622 first determines the target related to the warranty period, service life or remaining life of the cell or stack of the fuel cell unit 160. In one embodiment, the maximum output determining section 622 determines the above described target such that the warranty period and the like after update match the warranty period and the like before update. In another embodiment, the maximum output determining section 622 determines the above described target such that the warranty period and the like after update is longer than the warranty period and the like before update.

The maximum output determining section 622 then obtains the information indicating the current degradation degree of the fuel cell unit 160 from the stack degradation estimating section 644. In addition, the maximum output determining section 622 obtains the information indicating the rated value of the utility supply capability. The maximum output determining section 622 may obtain the information indicating the rated value of the utility supply capability through the similar procedure to the procedure with which the initial value of the maximum output is determined.

The maximum output determining section 622 then determines the maximum output of the fuel cell unit 160. For example, the maximum output determining section 622 determines the maximum output of the fuel cell unit 160 based on the rated value of the utility supply capability, the target related to the above described warranty period and the like, and the current degradation degree of the fuel cell unit 160. The maximum output determining section 622 may determine the maximum output of the fuel cell unit 160 based on (i) the relationship between the rated value of the utility supply capability and the degradation degree of the fuel cell unit 160 and (ii) the relationship between the degradation degree of the fuel cell unit 160 and the warranty period and the like of the fuel cell unit 160, and the like. The maximum output determining section 622 may determine the maximum output of the fuel cell unit 160 using the function or machine learning model in which the target variable is the maximum output of the fuel cell unit 160, and the explanatory variable is the warranty period and the like of the fuel cell unit 160, the rated value of the utility supply capability, and the degradation degree of the fuel cell unit 160.

In this way, the maximum output of the fuel cell unit 160 is determined such that the target related to the warranty period and the like can be achieved in consideration of the degree of the degradation of the fuel cell unit 160. In addition, the maximum output of the fuel cell unit 160 is determined such that the performance of the fuel cell unit 160 can be maintained for a period longer than the initial warranty period and the like.

It is noted that the method with which the maximum output determining section 622 determines the maximum output is not limited to the present embodiment. In another embodiment, the maximum output determining section 622 may determine, through the similar procedure, the maximum output of the fuel cell unit 160 based on the rated value of the utility supply capability, the rated value of the charge and discharge capability of the drive battery 154, the target related to the above described warranty period and the like, and the current degradation degree of the fuel cell unit 160. The maximum output determining section 622 may determine, through the similar procedure, the maximum output of the fuel cell unit 160 based on the rated value of the utility supply capability, the rated value of the charge and discharge capability of the drive battery 154, the target related to the above described warranty period and the like, the current degradation degree of the fuel cell unit 160, and the degradation degree of the drive battery 154.

In the present embodiment, the output characteristics generating section 626 generates the output characteristics of the fuel cell unit 160 based on the maximum output determined by the maximum output determining section 622. Examples of the output characteristics include the I-V curve, the I-P curve, the efficiency curve, and the like. The output characteristics generating section 626 may generate the a plurality of output characteristics with different conditions of the current amount, the oxidizing agent supply amount, the fuel supply amount, the temperature, and the like. The output characteristics generating section 626 may transmit the information indicating the output characteristics of the fuel cell unit 160 to at least one of the vehicle controlling section 130 and the electric power controlling section 230.

In the present embodiment, the operating point determining section 628 determines the appropriate operating point within the range of the maximum output determined by the maximum output determining section 622. When the fuel cell unit 160 has a plurality of operating modes, the operating point determining section 628 may determine the operating point for each operating mode.

In the present embodiment, the rated value estimating section 642 estimates the rated value of the utility supply capability. For example, the rated value estimating section 642 estimates the above described rated value by actuating the fuel cell unit 160 in the test mode for estimating the rated value of the utility supply capability.

In the present embodiment, the rated value estimating section 642 estimates the rated value of the charge and discharge capability of the drive battery 154. For example, the rated value estimating section 642 estimates the above described rated value by actuating the fuel cell unit 160 in the test mode for estimating the rated value of the charge and discharge capability of the drive battery 154.

In the present embodiment, the stack degradation estimating section 644 estimates the degradation degree indicating the progress status of the degradation of the cell or stack in the fuel cell unit 160. For example, the stack degradation estimating section 644 estimates the above described degradation degree by actuating the fuel cell unit 160 in the test mode for estimating the degradation degree of the fuel cell unit 160.

In the present embodiment, the battery degradation estimating section 646 estimates the degradation degree indicating the progress status of the degradation of the drive battery 154. For example, the battery degradation estimating section 646 estimates the above described degradation degree by actuating the drive battery 154 in the test mode for estimating the degradation degree of the drive battery 154.

In the present embodiment, the remaining life estimating section 648 estimates the remaining life of the fuel cell unit 160. The remaining life estimating section 648 may estimate the remaining life of the fuel cell unit 160 based on the degradation degree of the fuel cell unit 160 estimated by the stack degradation estimating section 644.

The operating condition determining section 620 may be one example of the rated capability obtaining section and the operating condition determining section. The maximum output determining section 622 may be one example of the rated capability obtaining section and the operating condition determining section.

Figure 7:
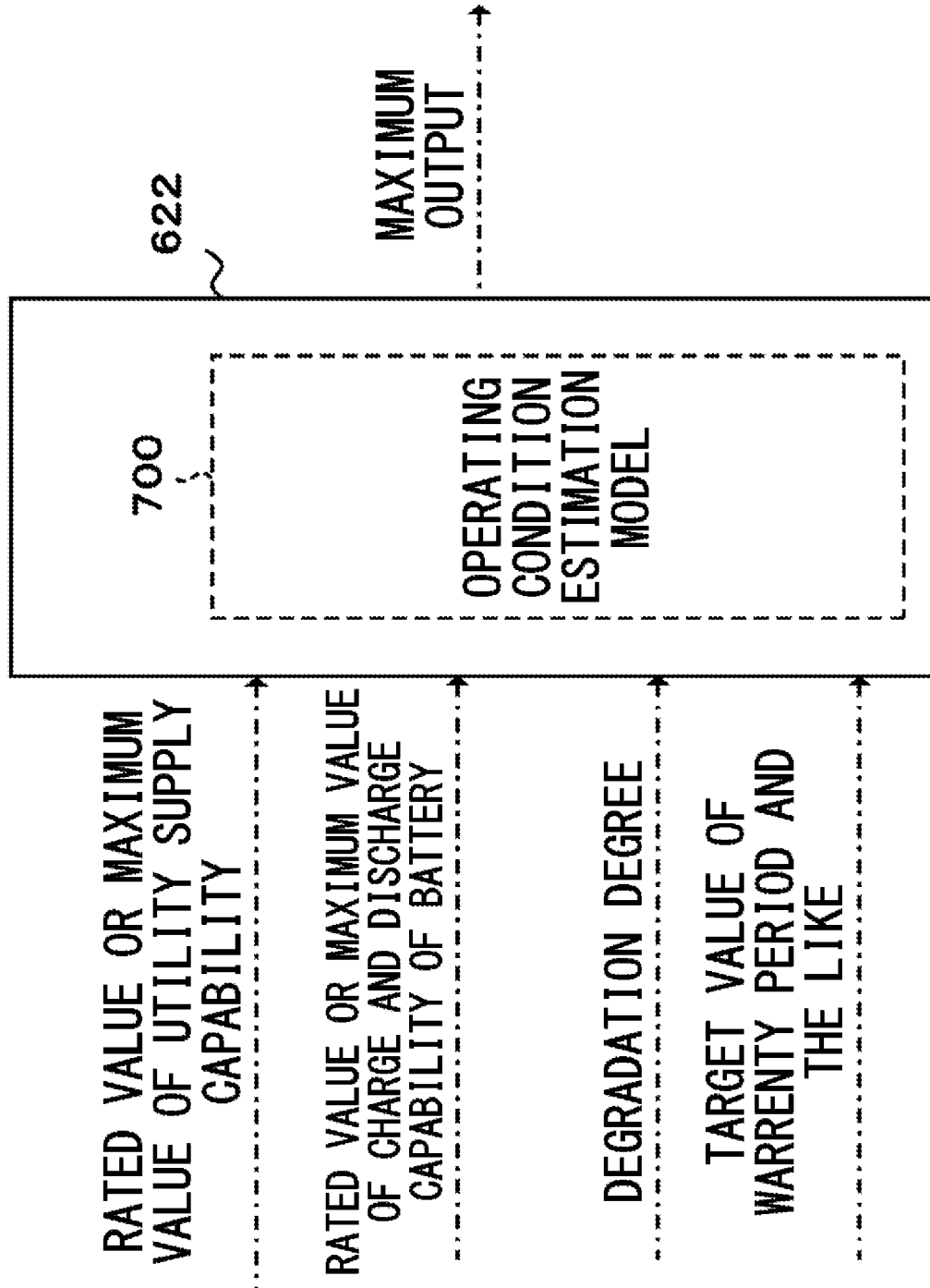
FIG. 7 schematically shows one example of the information processing in an operating condition determining section 620.

FIG. 7 schematically shows one example of the information processing in the operating condition determining section 620. More specifically, FIG. 7 schematically shows one example of the information processing in the maximum output determining section 622. In the present embodiment, the maximum output determining section 622 has a model 700 to be utilized to estimate the operating condition.

The model 700 may be a function or machine learning model in which the target variable is the maximum output of the fuel cell unit 160 and the explanatory variable is at least (i) the target value of the warranty period and the like and (ii) at least one of the rated value or maximum value of the utility supply capability and the rated value or maximum value of the charge and discharge capability of the drive battery 154. The model 700 may be a function or machine learning model in which the target variable is the maximum output of the fuel cell unit 160 and the explanatory variable is at least (i) the target value of the warranty period and the like, (ii) at least one of the rated value or maximum value of the utility supply capability, and the rated value or maximum value of the charge and discharge capability of the drive battery 154, and (iii) at least one of the degradation degree of the fuel cell unit 160 and the degradation degree of the drive battery 154.

According to one embodiment, the target value of the warranty period and the like, the current degradation degree of the fuel cell unit 160, and the rated value or current maximum value of the charge and discharge capability of the drive battery 154 are input into the model 700. The model 700 outputs the information related to the maximum output of the fuel cell unit 160 according to the input value. According to another embodiment, the target value of the warranty period and the like, the current degradation degree of the fuel cell unit 160, and the rated value or current maximum value of the utility supply capability are input into the model 700. The model 700 outputs the information related to the maximum output of the fuel cell unit 160 according to the input value.

Figure 9:
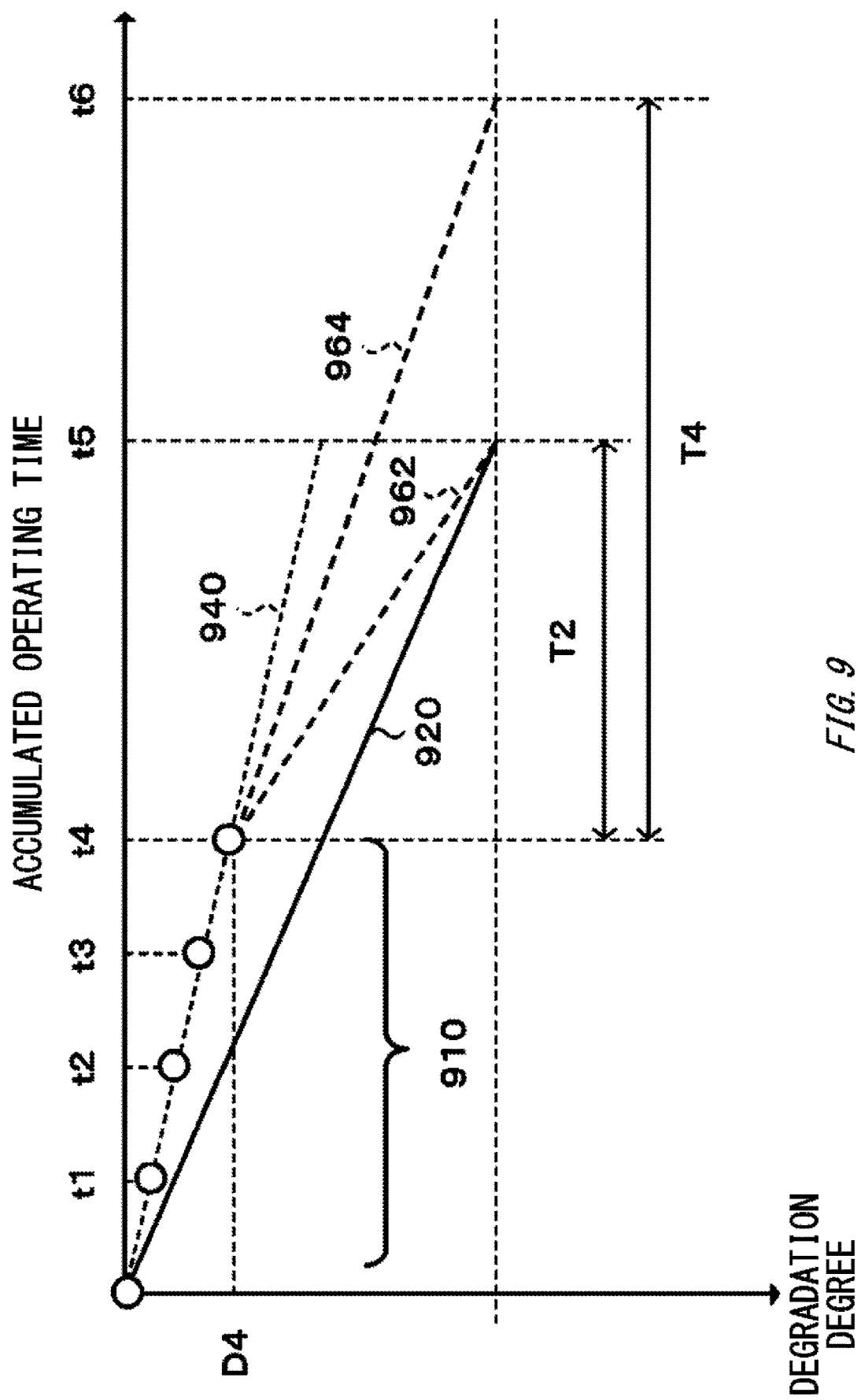
FIG. 9 schematically shows one example of the information processing in an operating condition determining section 620.

The summary of the procedure to determine the updated value of the maximum output described in reference to FIG. 7 is described using FIG. 8 and FIG. 9. FIG. 8 schematically shows one example of the data table 800. FIG. 9 schematically shows one example of the information processing in the operating condition determining section 620. The graph in FIG. 9 is made based on, for example, the data table 800.

As shown in FIG. 8, in the present embodiment, the data table 800 may be one example of the historical information stored in the historical information storage section 488. The data table 800 may be one example of the historical information related to the degradation of the fuel cell unit 160. In the present embodiment, the data table 800 stores the information indicating the time 822, the information indicating the elapsed time 832 after shipping, the information indicating the accumulated operating time 834, the information indicating the accumulated electric power generation amount 836, the information indicating the degradation degree 842, and the information indicating the remaining life 844 which are associated with each other. The remaining life 844 may include the record value of the remaining life 844 and the planned value of the remaining life 844.

The record value of the remaining life 844 may be the estimated value of the remaining life at the moment of time 822. The estimated value of the remaining life at the moment of time 822 is estimated by, for example, the remaining life estimating section 648. The planned value of the remaining life 844 is calculated, for example, as the difference between the remaining life at the moment when the fuel cell unit 160 is shipped and the accumulated operating time or accumulated electric power generation amount of the fuel cell unit 160 at the moment of time 822.

In FIG. 9, the circle symbol 910 represents the accumulated operating time and degradation degree at each time. The solid line 920 corresponds to the planned value of the remaining life. As mentioned above, the planned value of the remaining life is determined based on the relationship between the remaining life and the degradation degree. The solid line 920 indicates the relationship between the remaining life and the degradation degree in a case where the accumulated operating time is employed as the remaining life. The dotted line 940 represents the approximate function of the circle symbol 910. The dotted line 940 corresponds to the record value of the remaining life.

When the target of the warranty period and the like is determined such that the warranty period and the like after update match the warranty period and the like before update, the maximum output determining section 622 determines the maximum output of the fuel cell unit 160 such that the relationship between the accumulated operating time and the degradation degree is represented with the dotted line 962. When the target of the warranty period and the like is determined such that the warranty period and the like after update is longer than the warranty period and the like before update, the maximum output determining section 622 determines the maximum output of the fuel cell unit 160 such that the relationship between the accumulated operating time and the degradation degree is represented with the dotted line 964.

Figure 10:
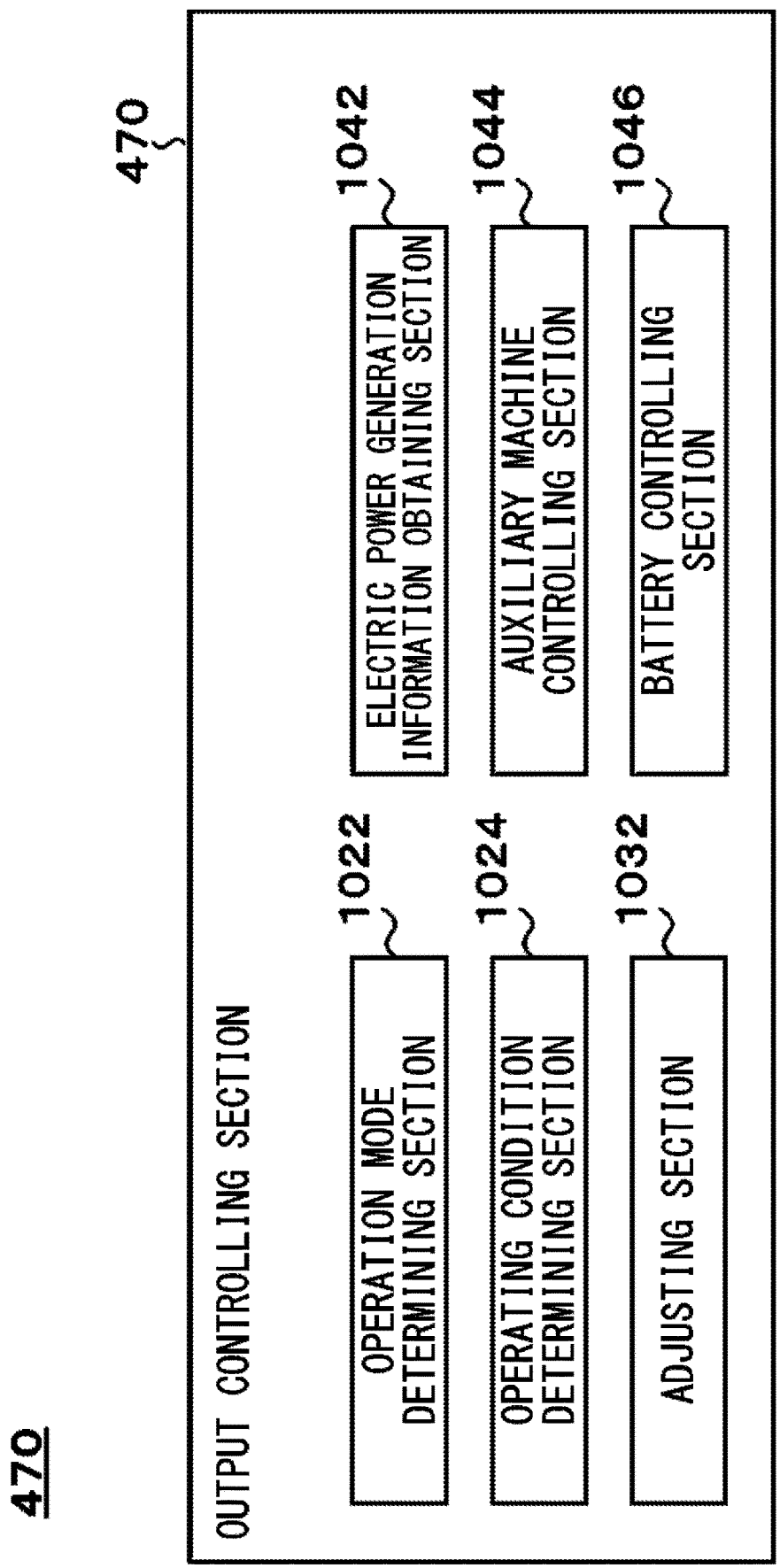
FIG. 10 schematically shows one example of the internal arrangement of an output controlling section 470.

FIG. 10 schematically shows one example of the internal arrangement of the output controlling section 470. In the present embodiment, the output controlling section 470 includes an operation mode determining section 1022, an operating condition determining section 1024, an adjusting section 1032, an electric power generation information obtaining section 1042, an auxiliary machine controlling section 1044, and a battery controlling section 1046.

In the present embodiment, the operation mode determining section 1022 determines the operation mode of the fuel cell unit 160. For example, the operation mode determining section 1022 determines the operation mode of the fuel cell unit 160 according to the instruction from the vehicle controlling section 130 or the electric power controlling section 230.

In the present embodiment, the operating condition determining section 1024 determines the operating condition of the fuel cell unit 160. For example, the operating condition determining section 1024 determines the operating condition of the fuel cell unit 160 according to the setting information stored in the setting information storage section 484. The operating condition determining section 1024 may determine the operating point of the fuel cell unit 160 according to the setting information stored in the setting information storage section 484.

In the present embodiment, the adjusting section 1032 adjusts the instruction from the vehicle controlling section 130 or the electric power controlling section 230, and the operating condition of the fuel cell unit 160. For example, in response to the fuel cell unit 160 operating according to the instruction from the vehicle controlling section 130 or the electric power controlling section 230, when the state of the fuel cell unit 160 exceeds the acceptable range of the operating condition of the fuel cell unit 160, the adjusting section 1032 transmits, to the vehicle controlling section 130 or the electric power controlling section 230, the information indicating that the fuel cell unit 160 cannot operate according to the instruction from the vehicle controlling section 130 or the electric power controlling section 230. The adjusting section 1032 may request the vehicle controlling section 130 or the electric power controlling section 230 to change the instruction or change the target of the warranty period and the like.

In the present embodiment, the electric power generation information obtaining section 1042 obtains the information related to the history of the electric power generation of the fuel cell unit 160 (also referred to as electric power generation history in some cases). Examples of the information included in the electric power generation history include the electric power generation amount of the fuel cell unit 160, the temperature of the fuel cell unit 160, the condition of the utility supplied to the fuel cell unit 160, the remaining capacity or SOC of the drive battery 154, the remaining capacity or SOC of the auxiliary machine battery 350, and the like. The electric power generation information obtaining section 1042 may store the electric power generation history in the historical information storage section 488.

In the present embodiment, the auxiliary machine controlling section 1044 controls the auxiliary machine of the fuel cell unit 160 to control the electric power generation of the fuel cell unit 160. Examples of the auxiliary machine of the fuel cell unit 160 include at least one of the fuel supplying unit 162, the oxidizing agent supplying unit 164, and the temperature adjustment medium supplying unit 166.

The auxiliary machine controlling section 1044 may perform the feedback control of the output from the fuel cell unit 160 based on the information obtained by the electric power generation information obtaining section 1042. The auxiliary machine controlling section 1044 may perform the feedback control of the electric power generation amount of the fuel cell unit 160 based on the information obtained by the electric power generation information obtaining section 1042, such that the temperature of the stack in the fuel cell unit 160 is maintained within a predetermined range.

In the present embodiment, the battery controlling section 1046 controls the charge/discharge of the auxiliary machine battery 350. The battery controlling section 1046 may control the charge/discharge of the auxiliary machine battery 350 such that the remaining capacity or SOC of the auxiliary machine battery 350 is maintained within a predetermined numerical range.

FIG. 11 schematically shows one example of the data table 1100. The data table 1100 may be one example of the historical information stored in the historical information storage section 488. The data table 1100 may be one example of the electric power generation history of the fuel cell unit 160. In the present embodiment, the data table 1100 stores the information indicating the time 1122, the information indicating the output 1124, the information indicating the working situation 1126 which are associated with each other. The information indicating the output 1124 may include the information indicating at least one of the output voltage, the output electric current, and the output rate. The information indicating the working situation 1126 may include the information indicating at least one of the temperature, the humidity, the operation mode, and the operation state.

Figure 12:
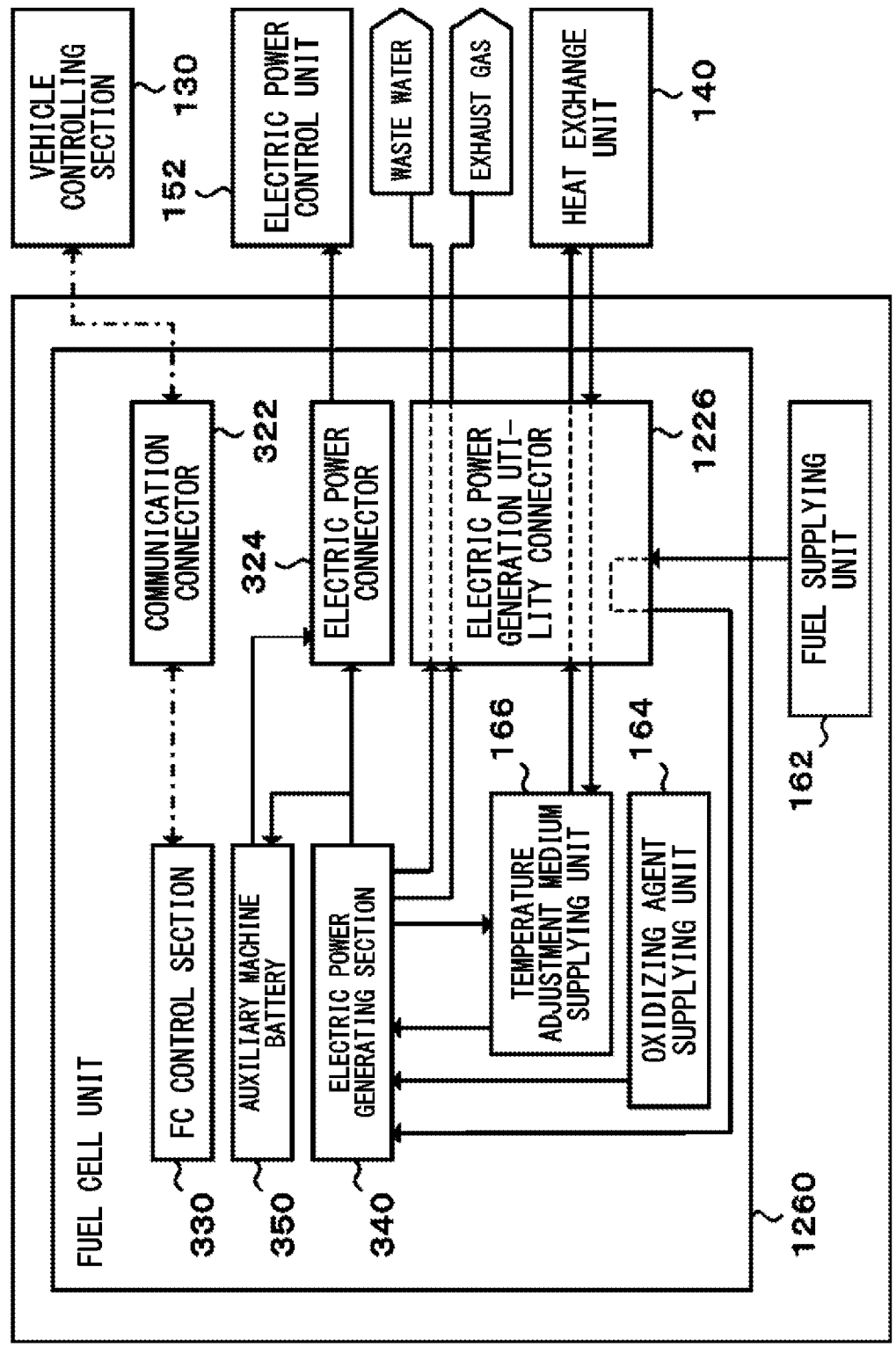
FIG. 12 schematically shows one example of the internal arrangement of an electric power generation system 1256.

FIG. 12 schematically shows one example of the internal arrangement of the electric power generation system 1256. In the present embodiment, the electric power generation system 1256 is different from the electric power generation system 156 in that it includes a fuel cell unit 1260 instead of the fuel cell unit 160. In the present embodiment, the fuel cell unit 1260 is different from the fuel cell unit 160 in that it has an oxidizing agent supplying unit 164 and the oxidizing agent supplying unit 164. In addition, the fuel cell unit 1260 has an electric power generation utility connector 1226 instead of the electric power generation utility connector 326.

As for the arrangement other than those described above, the fuel cell unit 1260 may have the similar feature to that of the fuel cell unit 160. For example, the fuel cell unit 1260 may be attachably and detachably attached to the electric power generation system 1256. It is noted that the features similar to those of the fuel cell unit 160 are not described in some cases.

In the present embodiment, the electric power generation utility connector 1226 connects the temperature adjustment medium supplying unit 166 to the heat exchange unit 140.

In this way, the temperature adjustment medium discharged from the electric power generating section 340 is discharged to the heat exchange unit 140 via the temperature adjustment medium supplying unit 166 and the electric power generation utility connector 1226. In addition, the temperature adjustment medium whose temperature is adjusted in the heat exchange unit 140 is supplied to the temperature adjustment medium supplying unit 166 via the electric power generation utility connector 1226.

In the present embodiment, the electric power generation utility connector 1226 connects the fuel supplying unit 162 to the electric power generating section 340. In this way, the fuel is supplied from the fuel supplying unit 162 to the electric power generating section 340. In the present embodiment, the electric power generation utility connector 1226 discharges the waste water and exhaust gas from the electric power generating section 340 to the electric power source system 150.

Figure 13:
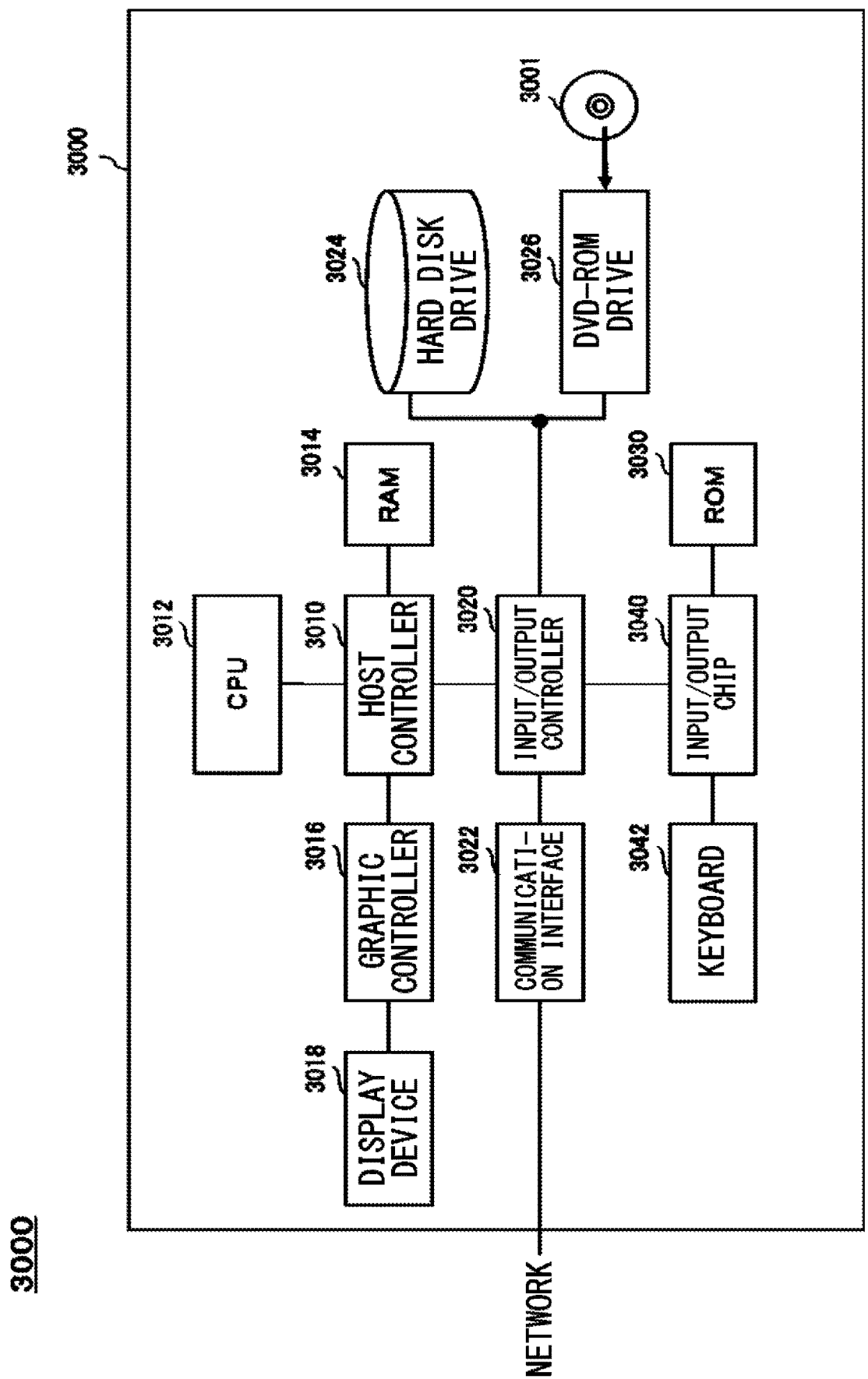
FIG. 13 schematically shows one example of the system arrangement of a computer 3000.

FIG. 13 shows an example of a computer 3000 in which aspects of the present invention may be wholly or partly embodied. A part of the vehicle 100 may be realized by the computer 3000. For example, the FC control section 330 is achieved by the computer 3000.

A program that is installed in the computer 3000 can cause the computer 3000 to perform operations associated with apparatuses of the embodiments of the present invention or to function as one or more "units" thereof, and/or cause the computer 3000 to perform processes of the embodiments of the present invention or steps thereof. Such a program may be executed by the CPU 3012 to cause the computer 3000 to perform certain operations associated with some or all of the blocks of flowcharts and block diagrams described herein.

The computer 3000 according to the present embodiment includes a CPU 3012, a RAM 3014, a graphic controller 3016, and a display device 3018, which are mutually connected by a host controller 3010. The computer 3000 also includes input/output units such as a communication interface 3022, a hard disk drive 3024, a DVD-ROM drive 3026 and an IC card drive, which are connected to the host controller 3010 via an input/output controller 3020. The computer also includes legacy input/output units such as a ROM 3030 and a keyboard 3042, which are connected to the input/output controller 3020 through an input/output chip 3040.

The CPU 3012 operates according to programs stored in the ROM 3030 and the RAM 3014, thereby controlling each unit. The graphic controller 3016 obtains image data generated by the CPU 3012 on a frame buffer or the like provided in the RAM 3014 or in itself, and causes the image data to be displayed on the display device 3018.

The communication interface 3022 communicates with other electronic devices via a network. The hard disk drive 3024 stores programs and data used by the CPU 3012 within the computer 3000. The DVD-ROM drive 3026 reads the programs or the data from the DVD-ROM 3001, and provides the hard disk drive 3024 with the programs or the data via the RAM 3014. The IC card drive reads the program and data from an IC card, and/or writes the program and data to the IC card.

The ROM 3030 stores therein a boot program or the like executed by the computer 3000 at the time of activation, and/or a program depending on the hardware of the computer 3000. The input/output chip 3040 may also connect various input/output units via a parallel port, a serial port, a keyboard port, a mouse port, and the like to the input/output controller 3020.

A program is provided by computer readable storage medium such as the DVD-ROM 3001 or the IC card. The program is read from the computer readable storage medium, installed into the hard disk drive 3024, RAM 3014, or ROM 3030, which are also examples of computer readable storage medium, and executed by the CPU 3012. The information processing described in these programs is read into the computer 3000, resulting in cooperation between a program and the above-mentioned various types of hardware resources. An apparatus or method may be constituted by realizing the operation or processing of information in accordance with the usage of the computer 3000.

For example, when communication is performed between the computer 3000 and an external device, the CPU 3012 may execute a communication program loaded onto the RAM 3014 to instruct communication processing to the communication interface 3022, based on the processing described in the communication program. The communication interface 3022, under control of the CPU 3012, reads transmission data stored on a transmission buffering region provided in a recording medium such as the RAM 3014, the hard disk drive 3024, the DVD-ROM 3001, or the IC card, and transmits the read transmission data to a network or writes reception data received from a network to a reception buffering region or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, and the like, and perform various types of processing on the data on the RAM 3014. The CPU 3012 may then write back the processed data to the external recording medium.

Various types of information such as various types of programs, data, tables, and databases may be stored in recording media and subjected to the information process. The CPU 3012 may perform various types of processing on the data read from the RAM 3014, which includes various types of operations, processing of information, condition judging, conditional branch, unconditional branch, search/replace of information, and the like, as described throughout this disclosure and designated by an instruction sequence of programs, and writes the result back to the RAM 3014. In addition, the CPU 3012 may search for information in a file, a database, and the like, in the recording medium. For example, when a plurality of entries, each having an attribute value of a first attribute associated with an attribute value of a second attribute, are stored in the recording medium, the CPU 3012 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable storage medium on or near the computer 3000. In addition, a recording medium such as a hard disk or a RAM provided in a server system connected to a dedicated communication network or the Internet can be used as the computer readable storage medium, thereby providing the program to the computer 3000 via the network.

While the embodiments of the present invention have been described, the technical scope of the invention is not limited to the above described embodiments. It is apparent to persons skilled in the art that various alterations and improvements can be added to the above-described embodiments. Also, matters explained with reference to a particular embodiment can be applied to other embodiments as long as there is no technical contradiction. Also, each component may have similar features to another component having the same name and a different reference numeral. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 100 vehicle, 120 drive motor, 130 vehicle controlling section, 140 heat exchange unit, 150 electric power source system, 152 electric power control unit, 154 drive battery, 156 electric power generation system, 160 fuel cell unit, 162 fuel supplying unit, 164 oxidizing agent supplying unit, 166 temperature adjustment medium supplying unit, 220 electric power converting section, 230 electric power controlling section, 322 communication connector, 324 electric power connector, 326 electric power generation utility connector, 330 FC control section, 340 electric power generating section, 350 auxiliary machine battery, 420 connection detecting section, 430 requirement specification obtaining section, 440 system information obtaining section, 450 setting section, 460 instruction obtaining section, 470 output controlling section, 480 storage section, 482 system information storage section, 484 setting information storage section, 486 estimation model storage section, 488 historical information storage section, 520 battery information obtaining section, 522 rated value obtaining section, 524 current value obtaining section, 540 utility information obtaining section, 542 rated value obtaining section, 544 current value obtaining section, 620 operating condition determining section, 622 maximum output determining section, 626 output characteristics generating section, 628 operating point determining section, 640 estimating section, 642 rated value estimating section, 644 stack degradation estimating section, 646 battery degradation estimating section, 648 remaining life estimating section, 700 model, 800 data table, 822 time, 832 elapsed time, 834 accumulated operating time, 836 accumulated electric power generation amount, 842 degradation degree, 844 remaining life, 910 circle symbol, 920 solid line, 940 dotted line, 962 dotted line, 964 dotted line, 1022 operation mode determining section, 1024 operating condition determining section, 1032 adjusting section, 1042 electric power generation information obtaining section, 1044 auxiliary machine controlling section, 1046 battery controlling section, 1100 data table, 1122 time, 1124 output, 1126 working situation, 1226 electric power generation utility connector, 1256 electric power generation system, 1260 fuel cell unit, 3000 computer, 3001 DVD-ROM, 3010 host controller, 3012 CPU, 3014 RAM, 3016 graphic controller, 3018 display device, 3020 input/output controller, 3022 communication interface, 3024 hard disk drive, 3026 DVD-ROM drive, 3030 ROM, 3040 input/output chip, 3042 keyboard

What is claimed is:

1. A control device for controlling an electric power supply device which is configured to supply electric power to a work machine having an electric power source,
the electric power supply device including:
a fuel cell different from the electric power source; and
an electric power connecting section for transferring electric power between the electric power source and the electric power supply device,
the control device comprising:
a rated capability obtaining section for obtaining information indicating a rated value of a charge and discharge capability of the electric power source of the work machine in response to the electric power supply device being mounted in the work machine or the electric power supply device being able to utilize electric power of the electric power source; and
an operating condition determining section for determine an operating condition of the electric power supply device based on the rated value.

2. The control device according to claim 1, wherein
the operating condition includes at least one of a maximum value of an output electric power of the fuel cell, a maximum value of an output electric current of the fuel cell, and a maximum value of an output rate of the fuel cell.

3. The control device according to claim 2, further comprising a detecting section for detecting that utility to be utilized for an operation of the fuel cell is available, wherein
the rated capability obtaining section is configured to perform a process for obtaining information indicating the rated value when the detecting section detects that the utility is available.

4. The control device according to claim 2, wherein the operating condition determining section includes:
a target determining section for determining a target related to a warranty period, a service life, or a remaining life of a cell or stack of the fuel cell;
a degradation estimating section for estimating a degradation degree indicating a progress status of a degradation of a cell or stack of the fuel cell; and
an operating condition output section for inputting the target determined by the target determining section, the degradation degree estimated by the degradation estimating section, and the rated value of the charge and discharge capability indicated by the information obtained by the rated capability obtaining section and outputting the operating condition of the electric power supply device.

5. The control device according to claim 2, wherein
the electric power supply device has an oxidizing agent supplying section for supplying oxidizing agent to the fuel cell, and
the oxidizing agent supplying section is configured to be actuated by electric power supplied from the electric power source of the work machine upon an activation of the fuel cell.

6. The control device according to claim 2, wherein
the electric power supply device includes:
an oxidizing agent supplying section for supplying oxidizing agent to the fuel cell; and
an activation electricity storage section for accumulating electric power used for activating the oxidizing agent supplying section, and the oxidizing agent supplying section is configured to be actuated, upon an activation of the fuel cell, by electric power supplied from the electric power source of the work machine when a remaining capacity of the activation electricity storage section is outside of a predetermined numerical range.

7. The control device according to claim 2, wherein the electric power supply device is configured to be attachably and detachably attached to the work machine.

8. The control device according to claim 1, further comprising a detecting section for detecting that utility to be utilized for an operation of the fuel cell is available, wherein
the rated capability obtaining section is configured to perform a process for obtaining information indicating the rated value when the detecting section detects that the utility is available.

9. The control device according to claim 8, wherein the process for obtaining information indicating the rated value includes a procedure to access a computer mounted in the work machine to obtain information indicating the rated value.

10. The control device according to claim 8, wherein the process to obtain information indicating the rated value includes a procedure to obtain information indicating the rated value by actuating the electric power supply device in a test mode for estimating a rated value of a charge and discharge capability of the electric power source of the work machine.

11. The control device according to claim 8, wherein the operating condition determining section includes:
a target determining section for determining a target related to a warranty period, a service life, or a remaining life of a cell or stack of the fuel cell;
a degradation estimating section for estimating a degradation degree indicating a progress status of a degradation of a cell or stack of the fuel cell; and
an operating condition output section for inputting the target determined by the target determining section, the degradation degree estimated by the degradation estimating section, and the rated value of the charge and discharge capability indicated by the information obtained by the rated capability obtaining section and outputting the operating condition of the electric power supply device.

12. The control device according to claim 8, wherein
the electric power supply device has an oxidizing agent supplying section for supplying oxidizing agent to the fuel cell, and
the oxidizing agent supplying section is configured to be actuated by electric power supplied from the electric power source of the work machine upon an activation of the fuel cell.

13. The control device according to claim 1, wherein the operating condition determining section includes:
a target determining section for determining a target related to a warranty period, a service life, or a remaining life of a cell or stack of the fuel cell;
a degradation estimating section for estimating a degradation degree indicating a progress status of a degradation of a cell or stack of the fuel cell; and
an operating condition output section for receiving an input of the target determined by the target determining section, the degradation degree estimated by the degradation estimating section, and the rated value of the charge and discharge capability indicated by the information obtained by the rated capability obtaining section and outputting the operating condition of the electric power supply device.

14. The control device according to claim 1, wherein
the electric power supply device has an oxidizing agent supplying section for supplying oxidizing agent to the fuel cell, and
the oxidizing agent supplying section is configured to be actuated by electric power supplied from the electric power source of the work machine upon an activation of the fuel cell.

15. The control device according to claim 1, wherein
the electric power supply device includes:
an oxidizing agent supplying section for supplying oxidizing agent to the fuel cell; and
an activation electricity storage section for accumulating electric power used for activating the oxidizing agent supplying section, and
the oxidizing agent supplying section is configured to be actuated, upon an activation of the fuel cell, by electric power supplied from the electric power source of the work machine when a remaining capacity of the activation electricity storage section is outside of a predetermined numerical range.

16. The control device according to claim 1, wherein the electric power supply device is configured to be attachably and detachably attached to the work machine.

17. The electric power supply device comprising:
the control device according to claim 1;
a fuel cell; and
an electric power connecting section for transferring electric power to and from an external electric power source.

18. A work machine comprising:
the electric power supply device according to claim 17; and
an electric motor for converting electrical energy supplied from the electric power supply device into mechanical energy.

19. A non-transitory computer readable recording medium having a program stored therein which causes a computer to perform a control method to control a electric power supply device which is configured to supply electric power to a work machine having an electric power source,
the electric power supply device comprising:
a fuel cell different from the electric power source; and
an electric power connecting section for transferring electric power between the electric power source and the electric power supply device,
the control method including:
obtaining information indicating a rated value of a charge and discharge capability of the electric power source of the work machine in response to the electric power supply device being mounted in the work machine or the electric power supply device being able to utilize electric power of the electric power source; and
determining an operating condition of the electric power supply device based on the rated value.

20. A control method to control an electric power supply device which is configured to supply electric power to a work machine having an electric power source,
the electric power supply device comprising:
a fuel cell different from the electric power source; and
an electric power connecting section for transferring electric power between the electric power source and the electric power supply device, the control method including:

obtaining information indicating a rated value of a charge and discharge capability of the electric power source of the work machine in response to the electric power supply device being mounted in the work machine or the electric power supply device being able to utilize an electric power of the electric power source; and determining an operating condition of the electric power supply device based on the rated value.

\* \* \* \* \*